US010995180B2

(12) United States Patent
Sanner et al.

(10) Patent No.: US 10,995,180 B2
(45) Date of Patent: May 4, 2021

(54) POLYETHERIMIDE COMPOSITIONS, METHODS OF MANUFACTURE, AND ARTICLES PREPARED THEREFROM

(71) Applicant: SABIC GLOBAL TECHNOLOGIES B.V., Bergen op Zoom (NL)

(72) Inventors: Mark A. Sanner, Evansville, IN (US); Thomas Link Guggenheim, Mt. Vernon, IN (US); Roy Ray Odle, Mt. Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 26 days.

(21) Appl. No.: 16/065,432

(22) PCT Filed: Dec. 29, 2016

(86) PCT No.: PCT/US2016/069102
§ 371 (c)(1),
(2) Date: Jun. 22, 2018

(87) PCT Pub. No.: WO2017/117343
PCT Pub. Date: Jul. 6, 2017

(65) Prior Publication Data
US 2018/0371169 A1 Dec. 27, 2018

Related U.S. Application Data

(60) Provisional application No. 62/273,549, filed on Dec. 31, 2015.

(51) Int. Cl.
C08L 79/08 (2006.01)
C08G 73/10 (2006.01)
C08K 3/16 (2006.01)
C08K 3/26 (2006.01)
C08K 3/30 (2006.01)
C08K 3/32 (2006.01)

(52) U.S. Cl.
CPC ..... C08G 73/1053 (2013.01); C08G 73/1007 (2013.01); C08G 73/1046 (2013.01); C08K 3/16 (2013.01); C08K 3/26 (2013.01); C08K 3/30 (2013.01); C08K 3/32 (2013.01); C08K 2003/262 (2013.01); C08K 2003/3045 (2013.01); C08K 2003/321 (2013.01)

(58) Field of Classification Search
CPC ............ C08G 73/1053; C08G 73/1046; C08G 73/1071; C08L 79/08
USPC ....................................................... 528/350
See application file for complete search history.

(56) References Cited

U.S. PATENT DOCUMENTS

| | | |
|---|---|---|
| 3,850,885 A | 11/1974 | Takekoshi et al. |
| 3,879,428 A | 4/1975 | Heath et al. |
| 3,905,942 A | 9/1975 | Takekoshi et al. |
| 3,917,643 A | 11/1975 | Takekoshi et al. |
| 3,991,004 A | 11/1976 | Takekoshi et al. |
| 3,998,840 A | 12/1976 | Williams, III et al. |
| 4,024,101 A | 5/1977 | Takekoshi et al. |
| 4,073,773 A | 2/1978 | Banucci et al. |
| 4,281,100 A | 7/1981 | Takekoshi |
| 4,293,683 A | 10/1981 | Takekoshi et al. |
| 4,324,863 A | 4/1982 | White et al. |
| 4,324,882 A | 4/1982 | Takekoshi |
| 4,324,884 A | 4/1982 | White et al. |
| 4,324,885 A | 4/1982 | White et al. |
| 4,330,666 A | 5/1982 | White et al. |
| 4,417,044 A | 11/1983 | Parekh |
| 4,443,592 A | 4/1984 | Schmidt et al. |
| 4,508,861 A | 4/1985 | Avakian |
| 4,910,288 A | 3/1990 | Dellacoletta |
| 6,001,957 A | 12/1999 | Puyenbroek et al. |
| 6,355,723 B1 | 3/2002 | van Baal et al. |
| 6,500,904 B1 | 12/2002 | Hayes |
| 6,919,422 B2 | 7/2005 | Gallucci et al. |
| 6,949,622 B2 | 9/2005 | Silvi et al. |
| 7,122,619 B2 | 10/2006 | Silvi et al. |
| 7,481,959 B2 | 1/2009 | Richards et al. |
| 8,080,671 B2 | 12/2011 | Guggenheim et al. |
| 8,357,773 B1 | 1/2013 | Gallucci et al. |
| 8,426,533 B2 | 4/2013 | Odle et al. |
| 8,524,854 B2 | 9/2013 | Chiong et al. |
| 8,535,792 B2 | 9/2013 | Lowery et al. |
| RE44,826 E | 4/2014 | Haring et al. |
| 8,907,042 B2 | 12/2014 | Kuhlman et al. |
| 9,127,127 B2 | 9/2015 | Guggenheim et al. |

(Continued)

FOREIGN PATENT DOCUMENTS

WO 2014194212 A1 12/2014

OTHER PUBLICATIONS

International Search Report for International Application No. PCT/US2016/069102, International Filing Date Dec. 29, 2016, dated Mar. 31, 2017, 5 pages.

(Continued)

Primary Examiner — Gregory Listvoyb
(74) Attorney, Agent, or Firm — Cantor Colburn LLP

(57) ABSTRACT

A polyetherimide composition includes a polyetherimide and two or more of a residual metal content, a sulfate anion, a phosphate anion, a nitrite anion, a nitrate anion, or a combination including at least one of the foregoing, a residual solvent content, a phosphorus-containing stabilizer, and alkali metal halide, alkaline earth metal halide, alkali metal carbonate, or a combination including at least one of the foregoing, wherein each of the aforementioned components, when present, is included in the composition in a particular amount. The resulting polyetherimide composition exhibits two or more useful properties. The polyetherimide composition can optionally further be combined with a polymer different from the polyetherimide to provide a thermoplastic composition. Methods of making the polyetherimide composition and articles including the polyetherimide composition are also described.

9 Claims, 1 Drawing Sheet

(56) References Cited

U.S. PATENT DOCUMENTS

| | | |
|---|---|---|
| 2009/0029615 A1 | 1/2009 | Susarla et al. |
| 2013/0053489 A1* | 2/2013 | Gallucci .................. C08K 5/13 524/128 |
| 2013/0108852 A1 | 5/2013 | Kuhlman et al. |
| 2013/0260125 A1 | 10/2013 | Ordonez et al. |
| 2013/0344313 A1 | 12/2013 | Ordonez et al. |
| 2014/0094535 A1 | 4/2014 | Guggenheim et al. |
| 2014/0094536 A1 | 4/2014 | Guggenheim et al. |
| 2014/0099510 A1 | 4/2014 | Chiong et al. |
| 2014/0213739 A1 | 7/2014 | Gallucci et al. |
| 2014/0357796 A1 | 12/2014 | Donovan et al. |
| 2015/0015224 A1 | 1/2015 | Yasusaka |
| 2015/0073116 A1 | 3/2015 | Kuhlman et al. |
| 2015/0079376 A1 | 3/2015 | Kuhlman |
| 2015/0079377 A1 | 3/2015 | Kuhlman |
| 2015/0080489 A1 | 3/2015 | Kuhlman et al. |

OTHER PUBLICATIONS

Written Opinion for International Application No. PCT/US2016/069102, International Filing Date Dec. 29, 2016, dated Mar. 31, 2017, 7 pages.

* cited by examiner

POLYETHERIMIDE COMPOSITIONS, METHODS OF MANUFACTURE, AND ARTICLES PREPARED THEREFROM

CROSS-REFERENCE TO RELATED APPLICATIONS

This application is a National Stage application of PCT/US2016/069102, filed Dec. 29, 2016, which claims the benefit of U.S. Provisional Application No. 62/273,549, filed Dec. 31, 2015, both of which are incorporated by reference herein in their entirety.

BACKGROUND

Polyetherimides are a class of high performance polymers that can be processed to make molded articles, fibers, films, foams, stock shapes, powders, and the like. Polyetherimides further have high strength, toughness, heat resistance, modulus, and broad chemical resistance, and so are widely used in industries as diverse as automotive, telecommunication, aerospace, electrical/electronics, transportation, and healthcare. Polyetherimides have shown versatility in various manufacturing processes, proving amenable to techniques including injection molding, extrusion, and thermoforming, to prepare various articles.

Polyetherimides can be derived from a dianhydride and an organic diamine. Alternatively, the manufacture of polyetherimides can be by polymerization of alkali metal salts of dihydroxy aromatic compounds, such as bisphenol A disodium salt (BPA-Na$_2$), with a substituted bis(phthalimide). Polyetherimide compositions have been the subject of intensive research and development, with the general goal of providing very pure, low color, polymers that meet exacting property standards. While these polyetherimides are excellent for their intended purposes, obtaining these compositions can be expensive, time-consuming, or require specialized or costly equipment. There accordingly remains a continuing need in the art for polyetherimide compositions that are suitable for a wide range of applications and that have a useful combination of properties, but that can be produced quickly or economically.

BRIEF DESCRIPTION

A polyetherimide composition comprises a polyetherimide and (a) two or more of the following compositional components: a residual metal content of greater than 40 ppm, greater than 20 ppm of a sulfate anion, greater than 20 ppm of a phosphate anion, greater than 5 ppm of a nitrite anion, a nitrate anion, or a combination comprising at least one of the foregoing, a residual solvent content of greater than 500 ppm, a phosphorus-containing stabilizer in an amount of 0 to 3 wt %, or greater than 25 ppm of an alkali metal halide, alkaline earth metal halide, alkali metal carbonate, or combination comprising at least one of the foregoing; or (b) wherein the polyetherimide has a residual reactive end group concentration of greater than 0.2 mole percent (mol %) of reactive anhydride end groups, or greater than 0.2 mol % of reactive amine endgroups, or both, preferably wherein the polyetherimide has a residual reactive end group concentration of greater than 0.2 mol % of reactive anhydride end groups and greater than 0.2 mol % of reactive amine endgroups; or (c) both (a) and (b); and (d) wherein the polyetherimide composition exhibits two or more of the following physical properties: a yellowness index of greater than 130, preferably greater than 140, more preferably greater than 150, at a thickness of 3.2 millimeters, determined according to ASTM D1925; a haze of greater than 10% at a thickness of 3.2 millimeters, determined according to ASTM D1003; a PDI* value of greater than 1.53, preferably greater than 1.55, more preferably greater than 1.57, wherein PDI* is the ratio of z-average molecular weight to weight average molecular weight as determined by gel permeation chromatography; a melt viscosity ratio of greater than 4, as determined from a ratio of a melt viscosity at a shear rate of 100/second to a melt viscosity at a shear rate of 5000/second, when measured by capillary rheometry at 380° C.; a pH of less than 6.5 or greater than 7; a tensile strength at yield greater than 84 MPa, as determined according to ASTM D638; and a heat distortion temperature at 1.82 MPa of greater than or equal to 150° C. as determined according to ASTM D648 on a 3.2 millimeter thick sample.

A thermoplastic composition comprises 1 to 99 wt % of the polyetherimide composition; and 1 to 99 wt % of a polymer different from the polyetherimide; and optionally a particulate filler, antioxidant, heat stabilizer, light stabilizer, ultraviolet light stabilizer, UV absorbing additive, plasticizer, lubricant, release agent, antistatic agent, anti-fog agent, antimicrobial agent, colorant, surface effect additive, radiation stabilizer, flame retardant, anti-drip agent, or a combination comprising at least one of the foregoing.

An article comprising the polyetherimide composition is also described.

A method for the manufacture of the polyetherimide composition comprises polymerizing an aromatic bis(ether phthalic anhydride) (5) with an organic diamine (6) as described herein.

A method for the manufacture of the polyetherimide composition comprises contacting a substituted phthalic anhydride (11) with an organic diamine (6) to provide a reaction mixture comprising a bis(phthalimide) (12); and polymerizing the bis(phthalimide) and an alkali metal salt of a dihydroxy aromatic compound (7) each as further described herein.

The above described and other features are exemplified by the following detailed description.

DETAILED DESCRIPTION

Figure 1:
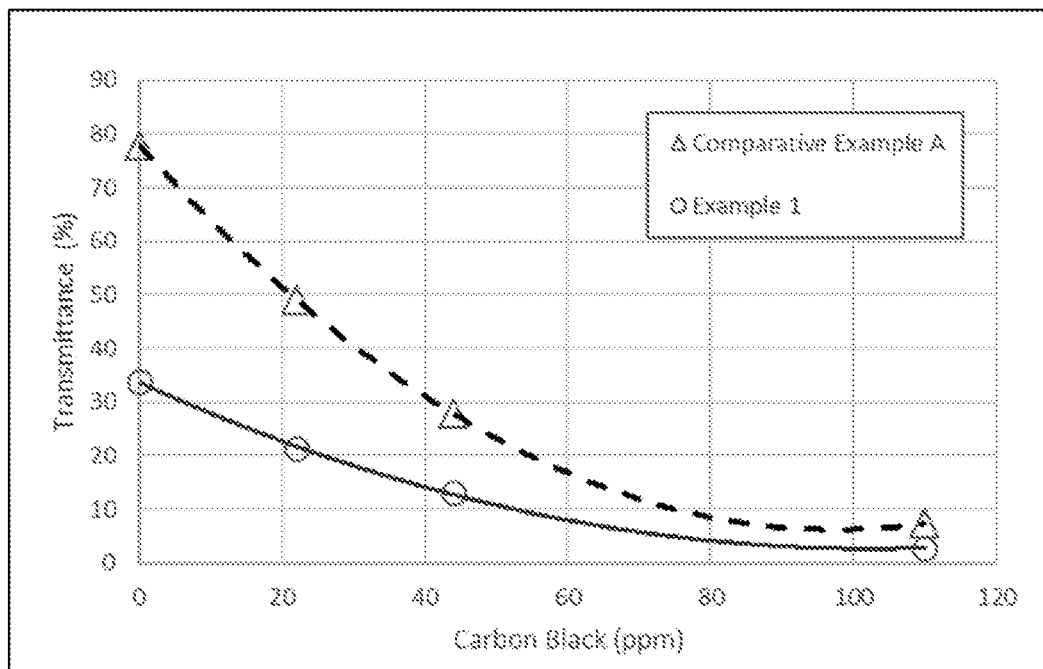
FIG. 1 is a graph of percent transmittance (%) versus carbon black concentration (ppm) and shows the effect of carbon black loading to percent transmittance in accordance with one or more embodiments.

The present inventors have unexpectedly discovered that compositions including certain polyetherimides, or optionally one or more additional components, can exhibit certain physical properties, making the compositions well-suited for a broad variety of applications. In some embodiments, the one or more additional components are present as a result of the method used to prepare the polyetherimide, for example the additional component can be a residual starting material, reaction component, byproducts, or the like. As such, the polyetherimide compositions can be faster or more economical to produce, as strict process conditions are generally not required to provide the polyetherimide compositions. Methods for the manufacture of the polyetherimide compositions are also described.

Accordingly, an aspect of the present disclosure is a polyetherimide composition. The polyetherimides are described in more detail below. In addition to the polyetherimide, the polyetherimide composition can also comprise (a) two or more of certain compositional components, for example a residual metal content, a sulfate ion content, a phosphate ion content, a nitrate or nitrite anion content, a residual solvent content, a phosphorus-containing stabilizer content, or an alkali metal content as described in more detail below. The polyetherimide can have (b) a certain end group content as described below. In still other embodiments, the polyetherimide composition can have (c) a combination of at least two of the compositional components (a) and the end group content (b).

In other embodiments, the polyetherimide composition can have three, or three or more of the compositional components (a), or four, or four or more of the compositional components (a), or five or six of the compositional components (a).

In yet other embodiments, the polyetherimide has the reactive end group level (b) and has two or more of the compositional components (a), or three or more of the compositional components (a), or four or more of the compositional components (a), or five or six of the compositional components (a).

The foregoing compositional components (a) or end group content (b) provide the polyetherimide compositions with certain physical properties (d), for example at least two of a certain yellowness index, haze, PDI* value, a melt viscosity ratio; pH, tensile strength at yield, or heat distortion temperature as described in further detail below. The polyetherimide compositions can have three, or three or more of the physical properties (d), or four, or four or more of the physical properties (d), or five, or five or more of the physical properties (d), or six or seven of the physical properties (d.

Thus, in an embodiment, the polyetherimide composition comprises (a) two or more of a residual metal content of greater than 40 parts per million (ppm); greater than 20 ppm of a sulfate anion; greater than 20 ppm of a phosphate anion; greater than 5 ppm of a nitrite anion, a nitrate anion, or a combination comprising at least one of the foregoing; a residual solvent content of greater than 500 ppm, preferably in combination with one or more additional compositional components (a); a phosphorus-containing stabilizer in an amount of 0 to 3 weight percent (wt %); or greater than 10 ppm of an alkali metal halide, alkaline earth metal halide, alkali metal carbonate, alkaline earth metal carbonate, or combination comprising at least one of the foregoing. Preferably, the above components are residual materials arising from the manufacture of the polyetherimide, and are not added separately. Stated another way, the compositional components are preferably present in the polyetherimide composition as residues arising from polymerization to form the polyetherimide, the manufacture of a starting material or intermediates used to form the polyetherimide, or arising from purification, storage, or transfer of any of the foregoing. Thus, the compositional components can arise from components such as a solvent, catalyst, endcapping agent, contaminant, aromatic bis(ether anhydride), organic diamine, salt, or the like.

When present, the residual metal content can be greater than 40 ppm, for example greater than greater than 40 to 1,000 ppm, or 40 to 500 ppm, or 50 to 500 ppm, or 60 to 500 ppm, or or 61 to 500 ppm, or 100 to 500 ppm; or 40 to 400 ppm, or 60 to 300 ppm, or 80 to 500 ppm, or 90 to 500 ppm, or 100 to 400 ppm, each based on the weight of the polyetherimide composition.

The residual metal content can include sodium, iron, molybdenum, chromium, zinc, aluminum, calcium, magnesium, manganese, cobalt, copper, silicon, potassium, nickel, or a combination comprising at least one of the foregoing. The residual metal content preferably comprises sodium, iron, molybdenum, magnesium, chromium, copper, potassium, nickel, or a combination comprising at least one of the foregoing. The residual metal comprises at least one of calcium and magnesium, or a combination comprising at least one of the foregoing. The calcium and magnesium, when present, can be in the form of calcium sulfate ($CaSO_4$) and magnesium sulfate ($MgSO_4$), respectively. As stated above, the residual metal content is not intentionally added to the polyetherimide composition; rather the metal content can be introduced during the method of making the polyetherimide, for example water used during synthesis of the monomers, polymerization, or purification can include various metals which are not completely removed. The resulting polyetherimide thus can have the recited residual metal content.

When present, the sulfate or phosphate anion can be included in an amount of greater than 20 ppm, for example 20 to 1,000 ppm, based on the weight of the polyetherimide composition. Within this range, the sulfate or phosphate anion can be present in an amount of 20 to 500 ppm 25 to 500 ppm, or 30 to ppm, or 35 to 500 ppm, or 40 to 500 ppm, or 45 to 500 ppm, or 50 to 500 ppm, or 100 ppm to 500 ppm. The sulfate anion, for example, can be present as a result of the method used to prepare the polyetherimide. For example, the sulfate anion can be derived from sulfuric acid used during the manufacture of the dianhydrides used to prepare the polyetherimide.

When present, phosphate anion can be included in an amount of greater than 20 ppm, for example 20 to 1,000 ppm, based on the weight of the polyetherimide composition. Within this range, the phosphate anion can be present in an amount of 20 to 500 ppm 25 to 500 ppm, or 30 to ppm, or 35 to 500 ppm, or 40 to 500 ppm, or 45 to 500 ppm, or 50 to 500 ppm, or 100 ppm to 500 ppm.

When present, the nitrite anion, nitrate anion, or combination comprising at least one of the foregoing can be present in an amount of greater than 5 ppm, for example greater than 5 to 1,000 ppm, or greater than 5 to 500 ppm, based on the weight of the polyetherimide composition. Within this range, the nitrite anion, nitrate anion, or combination comprising at least one of the foregoing can be present in an amount of greater than 5 ppm, or at least 10 ppm, or at least 25 ppm, or at least 50 ppm, or at least 100 ppm. Also within this range, the nitrite anion, nitrate anion, or combination comprising at least one of the foregoing can be present in an amount of less than or equal to 500 ppm, or less than or equal to 25,000 ppm, or less than or equal to 100 ppm, or less than or equal to 300 ppm. For example, the nitrite anion, nitrate anion, or combination comprising at least one of the foregoing can be present in an amount of greater than 5 to 500 ppm. The nitrite anion or the nitrate anion can be present as a result of the method used to prepare the polyetherimide. For example, the nitrite anion or the nitrate anion can be derived from a nitro-substituted reactant, for example a nitro-substituted phthalimide.

In some embodiments the polyetherimide composition can include a residual solvent, for example greater than 500 ppm of a residual solvent, based on the total weight of the polyetherimide composition. The residual solvent is preferably present in combination with two or more additional compositional components (a). The residual solvent content can be greater than 500 ppm to 10,000 ppm. Within this range, the residual solvent content can be greater than 500 ppm, or at least 1,000 ppm, or at least 1,500 ppm, or at least 2,000 ppm. Also within this range, the residual solvent content can be less than or equal to 10,000 ppm, or less than or equal to 7,500 ppm, or less than or equal to 5,000 ppm, or less than or equal to 2,500 ppm. The residual solvent content can preferably be greater than 500 to 10,000 ppm, or 1,000 to 10,000 ppm, or 1,500 to 10,000 ppm, or 1,500 to 5,000 ppm.

In some embodiments, the residual solvent is a portion of the solvent that was used during the manufacture of the polyetherimide composition or a starting material or intermediate of the polyetherimide composition. When present, the residual solvent can be an organic solvent. The residual solvent can be a dipolar aprotic solvent. The residual solvent can include, for example, ortho-dichlorobenzene, a N—($C_{1-6}$ alkyl) $C_{5-20}$ aliphatic lactam (for example, N-methylpyrrolidinone), dimethylacetamide, dimethylformamide, cresol (e.g., meta-cresol, ortho-cresol, para-cresol, or a combination comprising at least one of the foregoing), chlorobenzene, anisole, veratrole, dichlorotoluene, 1,2,4-trichlorobenzene, diphenyl sulfone, diphenylether, phenetole, dimethylsulfoxide, trichloromethane, acetone, methanol, ethanol, or a combination comprising at least one of the foregoing, preferably ortho-dichlorobenzene, N-methylpyrrolidinone, dimethylacetamide, dimethylformamide, cresol (e.g., meta-cresol, ortho-cresol, para-cresol, or a combination comprising at least one of the foregoing), chlorobenzene, anisole, veratrole, dichlorotoluene, 1,2,4-trichlorobenzene, diphenyl sulfone, diphenylether, phenetole, dimethylsulfoxide, trichloromethane, acetone, methanol, ethanol, or a combination comprising at least one of the foregoing, more preferably ortho-dichlorobenzene, N-methylpyrrolidinone, dimethylacetamide, dimethylformamide, cresol, chlorobenzene, anisole, veratrole, dichlorotoluene, 1,2,4-trichlorobenzene, diphenyl sulfone, diphenylether, phenetole, dimethylsulfoxide, trichloromethane, acetone, methanol, ethanol, or a combination comprising at least one of the foregoing. The residual solvent can include ortho-dichlorobenzene, a N-methylpyrrolidinone, dimethylacetamide, dimethylformamide, chlorobenzene, anisole, veratrole, dichlorotoluene, 1,2,4-trichlorobenzene, diphenyl sulfone, diphenylether, phenetole, dimethylsulfoxide, acetone, methanol, ethanol, or a combination comprising at least one of the foregoing.

The polyetherimide composition can optionally include a phosphorus-containing stabilizer, preferably in an amount of 0 to 3 wt %, more preferably greater than 0 to 3 wt %, based on the total weight of the composition. The phosphorus-containing stabilizer is preferably present in combination with two or more additional compositional components (a). For example, in an embodiment, the polyetherimide composition can include a residual metal content of greater than 40 ppm and the phosphorus-containing stabilizer in an amount of 0 to 3 wt %. The polyetherimide composition can include a residual solvent content of greater than 500 ppm and the phosphorus-containing stabilizer in an amount of 0 to 3 wt %. The polyetherimide composition can include a residual metal content of greater than 40 ppm, a residual solvent content of greater than 500 ppm, and the phosphorus-containing stabilizer in an amount of 0 to 3 wt %. Additional combinations of the phosphorus-containing stabilizer and one, two, three, four, five, or more additional compositional components can also be used.

The phosphorus-containing stabilizer can be present in an amount of 0.01 to 3 wt %, or 0.1 to 3 wt %, or 0.5 to 3 wt %, or 1 to 3 wt %, or 2 to 3 wt %, or 0.01 to 2 wt %, or 0.1 to 2 wt %, or 0.5 to 2 wt %, or 0.01 to 1 wt %, or 0.0.1 to 1 wt %, or 0.5 to 1 wt %, or 0.01 to 0.5 wt %, or 1 to 3 wt %, or 1 to 2 wt %, or 2 to 3 wt %, based on the total weight of the composition. The phosphorus-containing stabilizer can be, for example, an organophosphate (e.g., triphenyl phosphite, tris-(2,6-dimethylphenyl)phosphite, tris-(mixed mono- and di-nonylphenyl)phosphite or the like), a phosphonate (e.g., dimethylbenzene phosphonate or the like), a phosphate (e.g., trimethyl phosphate, or the like), or combinations comprising at least one of the foregoing. Non-limiting examples of phosphorus-containing stabilizers can include; tris(2,4-di-tert-butylphenyl)phosphite; 3,9-di(2,4-di-tert-butylphenoxy)-2,4,8,10-tetraoxa-3,9-diphosphaspiro[5.5]undecane; 3,9-di(2,4-dicumylphenoxy)-2,4,8,10-tetraoxa-3,9-diphosphaspiro[5.5]undecane; tris(p-nonylphenyl)phosphite; 2,2',2"-nitrilo[triethyl-tris[3,3',5,5'-tetra-tertbutyl-1,1'-biphenyl-2'-diyl]phosphite]; 3,9-distearyloxy-2,4,8,10-tetraoxa-3,9-diphosphaspiro[5.5] undecane; dilauryl phosphite; 3,9-di[2,6-di-tert-butyl-4-methylphenoxy]-2,4,8,10-tetraoxa-3,9-diphosphaspiro[5.5] undecane; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-biphenylene diphosphonite; (2,4,6-tri-tert-butylphenyl)-2-butyl-2-ethyl-1,3-propanediolphosphite; triisodecylphosphite; and mixtures of phosphites containing at least one of the foregoing. Tris(2, 4-di-tert-butylphenyl) phosphite; 2,4,6-tri-tert-butylphenyl-2-butyl-2-ethyl-1,3-propanediol phosphite; bis(2,4-di-tert-butylphenyl)pentaerythritol diphosphite can be especially preferred, as well as mixtures of phosphites containing at least one of the foregoing phosphites, and the like.

The polyetherimide composition can further include one or more antioxidants different from the phosphorus-containing stabilizer. The one or more antioxidants can include, for example, alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid such as N,N'-hexane-1,6-diylbis(3-(3,5-di-tert.-butyl-4-hydroxyphenylpropionamide)), 1,3,5-Tris(4-tert-butyl-3-hydroxy-2,6-dimethylbenzyl)-1,3,5-triazine-2,4,6-trione, or combinations comprising at least one of the foregoing antioxidants. The one or more antioxidants can be present in an amount of 0.01 to 10 wt %, or 0.01 to 5 wt %, or 0.01 to 1 wt %, or 0.1 to 10 wt %, or 0.1 to 5 wt %, or 0.1 to 1 wt %, based on the total weight of the composition.

The polyetherimide composition can include an alkali metal halide, alkaline earth metal halide, an alkali metal carbonate, alkaline earth metal carbonate, or a combination comprising at least one of the foregoing, for example an alkali metal chloride, alkaline earth metal chloride, alkali metal fluoride, alkaline earth metal fluoride, alkali metal iodide, alkaline earth metal iodide, or a combination comprising at least one of the foregoing, preferably sodium chloride. An exemplary alkali metal carbonate is sodium carbonate. Optionally, the alkali metal halide, the alkaline earth metal halide, alkali metal carbonate, alkaline earth metal carbonate, or combination comprising at least one of the foregoing can be in the form of particles, for example particles having an average diameter of 1 to 2 micrometers. The alkali metal halide, alkaline earth metal halide, alkali metal carbonate, or combination comprising at least one of the foregoing can be present in an amount of greater than 10 ppm, based on the total weight of the polyetherimide composition. The alkali metal halide, alkaline earth metal halide, alkali metal carbonate, or combination comprising at least one of the foregoing can be a by-product of the polymerization reaction used to produce the polyetherimide. When present, the alkali metal halide, alkaline earth metal halide, alkali metal carbonate, or combination comprising at least one of the foregoing can be present in an amount of greater than 10 to 5,000 ppm. Within this range, the alkali metal halide, alkaline earth metal halide, alkali metal carbonate, or combination comprising at least one of the foregoing can be present in an amount of at least 25 ppm, or at least 30 ppm, or at least 50, ppm, or at least 100 ppm. Also within this range, the alkali metal halide, alkaline earth metal halide, alkali metal carbonate, or combination comprising at least one of the foregoing can be present in an amount of less than or equal to 2,000 ppm, or less than or equal to 1,000 ppm, or less than or equal to 500 ppm, or less than or equal to 250 ppm. For example, the alkali metal halide, alkaline earth metal halide, alkali metal carbonate, or combination comprising at least one of the foregoing can be present in an amount of greater than 10 to 1,000 ppm, or 50 to 1,000 ppm, or 50 to 500 ppm, or 50 to 250 ppm, or greater than 10 to 500 ppm.

In some embodiments, in addition to including one or more of the above-described components, the polyetherimide composition can optionally further include a residual chloride anion. When present, the residual chloride anion can be in an amount of greater than 10 ppm, preferably greater than 10 to 1,000 ppm, greater than 10 to 500 ppm, or greater than 20 to 500 ppm, or greater 100 ppm to 500 ppm. The chloride anion can be derived from a phase transfer catalyst, contamination of raw materials or process water, or as a sodium chloride by-product that can arise during the ether-forming polymerization reaction The polyetherimide composition can optionally further include, based on the total weight of the polyetherimide composition, greater than 1 wt %, or greater than 3 wt %, or greater than 5 wt %, up to 10 wt % of an impurity comprising a moiety derived from a monomer, an endcapping agent, or a combination comprising at least one of the foregoing. For example, the impurity can comprise a moiety derived from incomplete polymerization of monomers, a side reaction (e.g., an amic acid), or an unreacted monomer or endcapping agent. The impurity can have a molecular weight of 500 to 1000 Daltons (Da), or 300 to 1000 Da, or a molecular weight of 500 Da or less, for example 200 to 500 Da.

As stated above, the polyetherimide of the polyetherimide can have (b) one of a reactive end group concentration of greater than 0.2 mol % of reactive anhydride end groups, or greater than 0.2 mol % of reactive amine end groups, preferably (c) both. The reactive anhydride end group concentration can be greater than 0.3 mol %, or greater than 0.4 mol %, or greater than 0.5 mol %. The reactive amine end group concentration can be greater than 0.3 mol %, or greater than 0.4 mol %, or greater than 0.5 mol %. In a preferred embodiment, the polyetherimide of the polyetherimide composition can have both a reactive end group concentration of greater than 0.2 mol %, or greater than 0.3 mol %, or greater than 0.4 mol %, or greater than 0.5 mol % of reactive anhydride endgroups, or a reactive end group concentration of greater than 0.2 mol %, or greater than 0.3 mol %, or greater than 0.4 mol %, or greater than 0.5 mol % of reactive amine endgroups.

The polyetherimide preferably comprises both two or more of the compositional components (a) in combination with the above-described end group content (b) or (c). For example, the polyetherimide composition can include a polyetherimide having an end group concentration of greater than 0.2 mol % of reactive anhydride end groups, or greater than 0.2 mol % of reactive amine end groups, or both, and a residual metal content of greater than 40 ppm; or an end group concentration of greater than 0.2 mol % of reactive anhydride end groups, or greater than 0.2 mol % of reactive amine end groups, or both, and a phosphorus-containing stabilizer in an amount of 0 to 3 wt %. The polyetherimide can have an end group concentration of greater than 0.2 mol % of reactive anhydride end groups, or greater than 0.2 mol % of reactive amine end groups, or both, and a residual metal content of greater than 40 ppm, a residual solvent content of greater than 500 ppm, and the phosphorus-containing stabilizer in an amount of 0 to 3 wt %. Additional combinations of the phosphorus-containing stabilizer and one, two, three, four, five, or more additional compositional components can also be used to provide the polyetherimide composition wherein the polyetherimide has an end group concentration of greater than 0.2 mol % of reactive anhydride end groups, or greater than 0.2 mol % of reactive amine end groups, or both. In other preferred embodiments, the polyetherimide can have one of a reactive end group concentration of greater than 0.2 mol % of reactive anhydride end groups, or greater than 0.2 mol % of reactive amine end groups, in combination with two or more of the compositional components (a).

The concentration of reactive anhydride end groups and reactive amine end groups in the composition can be analyzed by various titration and spectroscopic methods known in the art, for example infrared spectroscopy, nuclear magnetic resonance spectroscopy, Raman spectroscopy, or fluorescence spectroscopy. The amount of reactive anhydride or reactive amine end groups can be controlled by controlling the stoichiometry of the monomers used to make the polyetherimide composition. The reactive end group concentration can be measured in the reaction mixture during the preparation of the polyetherimide composition, and additional dianhydride or diamine can be added to achieve the desired reactive end group concentration. The amount of the reactive anhydride or reactive amine end groups can be pre-selected (i.e., determined prior to the synthesis of the polyetherimide composition). The concentration of the reactive anhydride or reactive amine end groups can arise from inaccuracies in providing the dianhydride or diamine starting materials to the reaction.

In an embodiment, the polyetherimide composition can include a particular combination of the above-described components. For example, in an embodiment, the polyetherimide composition comprises greater than 40 to 500 ppm, of the residual metal content comprising sodium, iron, molybdenum, magnesium, copper, calcium, chromium, potassium, nickel, or a combination comprising at least one of the foregoing, and 500 to 10,000 ppm of the residual solvent comprising ortho-dichlorobenzene, N-methylpyrrolidinone, dimethylacetamide, cresol, chlorobenzene, anisole, veratrole, or a combination comprising at least one of the foregoing.

In other embodiments, the residual solvent content can preferably be 500 to 10,000 ppm, or 1,000 to 10,000 ppm, or 1,500 to 10,000 ppm, or 1,500 to 5,000 ppm in combination with at least one other of the compositional limitations (a) or polyetherimide (b).

The polyetherimide composition comprising the compositional components (a), the polyetherimide having the specified end group content (b), or both (c), can exhibit two or more of the following physical properties (d). All ASTM tests are based on the 2015 edition of the Annual Book of ASTM Standards unless otherwise indicated. In some embodiments, it has surprisingly been found that these desired properties can be obtained even in the presence to the compositional components (a), the polyetherimide (b), or both (c); and that such compositions are useful in a wide variety of applications.

The polyetherimide composition can have a yellowness index of greater than 130 at a thickness of 3.2 millimeters, determined according to ASTM D1925. The polyetherimide composition can have a yellowness index of greater than 130, or greater than 140, or greater than 150, or greater than 160. The yellowness index of the polyetherimide composition can be 130 to 300, or 130 to 250, or 135 to 190, or 135 to 160, or than 140 to 300, or than 140 to 250, or 145 to 190, or 145 to 160, or than 150 to 300, or than 150 to 250, or 155 to 190, or 155 to 160, or than 160 to 300, or than 160 to 250, or 165 to 190, or 165 to 170, each determined at a thickness of 3.2 millimeters, according to ASTM D1925.

The polyetherimide composition having the specified yellowness index can provide several advantageous features. For example, a polyetherimide composition having a yellowness index of greater than 130 can accordingly reduce the amount of light transmittance through a molded article comprising the composition. This can be desirable as the inherent reduced transmittance precludes the need for various additives that are typically included when reduced transmittance is desired, for example, pigments including carbon black. Thus a secondary compounding operation for including such additives can advantageously be eliminated. A polyetherimide composition having the specified yellowness index is further expected to have improved surface aesthetics relative to a polyetherimide composition including a polyetherimide having a low yellowness index (i.e., less than 130) and one or more pigments in an amount effective to achieve the same color as the polyetherimide composition having a yellowness index that is greater than 130. The expected improvement in surface aesthetics is due to the lack of pigments required for the polyetherimide composition. More specifically, surface properties such as gloss and surface roughness (Ra, Ry, and Rz) would be improved. For example, use of pigments can lead to a surface having protrusions or a rough appearance. The present compositions, not requiring pigments, can lead to a smoother surface, and thus improved surface aesthetics. In another example, a polyetherimide composition having a yellowness index greater than 130 is expected to have improved Dynatup impact and tensile elongation properties relative to a similar composition having a low yellowness index with added pigment in an amount effective to provide a color that is equivalent to that of the composition having a yellowness index greater than 130. The improvement in mechanical properties is believed to be due to the lack of pigments needed to produce a yellowness index of greater than 130 for the polyetherimide composition, as inclusion of pigments can reduce mechanical properties. In another example, a molded article prepared from the composition having a yellowness index of greater than 130 in combination with a low percent transmittance such that the article is translucent, can allow for articles having unacceptable surface defects (e.g., silver streaks) to be easily identified and disposed of prior to any secondary operations (e.g., metallization). The polyetherimide compositions having a high yellowness index (e.g., greater than 130) further require reduced levels of red, yellow, and black pigments in order to obtain a dark color, compared to a similar composition having a low yellowness index. As discussed above, reducing the amount of pigments avoids adverse effect on various physical properties of the composition.

The flame retardant properties of the polyetherimide composition can be improved compared to a similar composition which does not include the two or more compositional components (a), the polyetherimide having the specified end group content (b) or (c), or physical properties (d). For example, a UL rating of V0 can be achieved.

The polyetherimide composition can have a haze of greater than 10% at a thickness of 3.2 millimeters, determined according to ASTM D1003. The polyetherimide composition can exhibit a haze of greater than 10, up to 100%, preferably 12 to 75%, more preferably 12 to 50%, each determined according to ASTM D1003 at a thickness of 3.2 millimeters.

The polyetherimide can have a PDI* value of greater than 1.53, preferably greater than 1.55, more preferably greater than 1.57. PDI* as used herein refers to the ratio of the z-average molecular weight to weight average molecular as determined by gel permeation chromatography. The z-average molecular weight and the weight average molecular weight can be determined relative to polystyrene standards. The polyetherimide composition can exhibit a PDI* of greater than 1.53 to 2, or 1.55 to 2, or 1.57 to 2, as determined by gel permeation chromatography. The polyetherimide composition can have a PDI* greater than 2, for example, greater than 2 to 4, or 2 to 3, or 2 to 2.5.

In some embodiments, in addition to the other properties described herein, the polyetherimide can have an R* value of greater than 2.1, preferably greater than 2.4, for example 2.1 to 3 or 2.4 to 3. The polyetherimide composition can have a R* value of greater than 2.5, or greater than 2.75, or greater than 3, or greater than 3.25, or greater than 3.5, or greater than 4, of greater than 4.5. R* is a measure of shear thinning behavior of the polymer. R* as used herein refers to the ratio of viscosities measured under nitrogen at 1 radian per second (rad/sec) and 100 rad/sec at the temperature that gives a viscosity of 20,000 poise at 100 rad/sec. It is calculated as the ratio of viscosities measured at 1 rad/sec and 100 rad/sec at a fixed temperature (the R* temperature) under nitrogen, where the R* temperature is defined as the temperature that gives a viscosity of 20,000 poise at 100 rad/sec, under nitrogen. This temperature is typically between 310 and 345° C., depending on the molecular weight of the material. The method is based upon, but is not in full compliance with, ASTM D4440-01. All samples are vacuum dried at 150° C. for at least 4 hours before measurement. R* can be determined using known methods, for example by parallel plate rheometry using a Rheometric Scientific ARES instrument equipped with 25 millimeter parallel plates. The polyetherimide composition can have an R* value of 2.1 to 5, or 2.4 to 5, or 2.6 to 3.5.

In some embodiments, in addition to the other properties described herein, the polyetherimide composition can have a relative thermal index (RTI) of less than 170° C., determined according to Underwriting Laboratories (UL protocol UL746B). The polyetherimide composition can exhibit a RTI of greater than 0 to less than 170° C., preferably 50 to 160° C., more preferably 100 to 160° C., as determined according to UL746B. RTI is a property that is indicative of how the polyetherimide composition's properties degrade after being subjected to heat aging. The RTI can be obtained directly by performing the extended test in accordance with the UL746B protocol, or can be indirectly inferred with an accelerated heat aging testing method. Briefly, the RTI is inferred by comparing the peak molecular weight (Mp) degradation (decrease) of an experimental sample with the peak (Mp) degradation of a control sample that is a polyetherimide made by a method in which the polyetherimide is made from bisphenol-A dianhydride, phthalic anhydride and meta-phenylene diamine that has been verified to have a RTI of greater than or equal to 170° C. by UL protocol UL746B. When the percent peak molecular weight degradation of an experimental sample is within 10% of the percent peak molecular weight degradation of the control sample, the RTI of the experimental sample is said to have the same RTI of the control sample, which is greater than or equal to 170° C. By contrast, when the percent peak molecular weight degradation of an experimental sample is greater than 10% of the percent peak molecular weight degradation of the control sample that is a polyetherimide made from a dianhydride and meta-phenylene diamine, the RTI of the experimental sample is said to have a RTI of less than 170° C., e.g., 160° C. For example, if the peak molecular weight (Mp) drop of a control sample at 230° C. in 12 or 13 days is 8%, then a resin with less than or equal to 18% Mp drop would have the equivalent RTI rating as the control sample. Indirectly determined RTI ratings are verifiable by the UL protocol UL746B. Due to the duration of the UL protocol UL746B (which can take months), it is not always practical or possible to determine the Relative Thermal Index rating of a candidate resin sample by UL protocol UL746B. Relative Thermal Index ratings indirectly obtained are preferably verified by the UL protocol UL746B whenever practical.

In some embodiments, in addition to the other properties described herein, the polyetherimide composition can exhibit a change in melt viscosity, when held at 360° C. for 30 minutes at 10 radians per second, of greater than 25% of the melt viscosity of the initial polyetherimide, as measured using parallel plate rheometry, preferably under nitrogen. The polyetherimide composition can exhibit a change in melt viscosity of greater than 25 to 75%, preferably 30 to 50% of the melt viscosity of the initial polyetherimide, as measured by parallel plate rheometry when held at 360° C. for 30 minutes at 10 radians/second under nitrogen. The polyetherimide composition can form a gel or char when held at 360° C. for 30 minutes.

The polyetherimide composition can have a melt viscosity ratio of greater than 4, as determined from a ratio of a melt viscosity at a shear rate of 100 l/second to a melt viscosity at a shear rate of 5,000 l/second, when measured by capillary rheometry at 380° C. For example, the melt viscosity ratio of the polyetherimide composition can be greater than 4, or 5, or 6, or 7, or 8, or 9, or 10, as determined from a ratio of a melt viscosity at a shear rate of 100 l/second to a melt viscosity at a shear rate of 5,000 l/second, when measured by capillary rheometry at 380° C. The polyetherimide composition can have a melt viscosity ratio of greater than 4 to 5, or 4 to 6, or 4 to 7, or 4 to 8, or 4 to 9, or 4 to 10, as determined from a ratio of a melt viscosity at a shear rate of 100 l/second to a melt viscosity at a shear rate of 5,000 l/second, when measured by capillary rheometry at 380° C.

The polyetherimide composition can have a pH of less than 6.5 or greater than 7. For example, the pH of the polyetherimide composition can be 0 to 1, 2, 3, 4, 5, 6, or 6.5, preferably 2 to 6.5 or 2 to 6, or 3 to 5. The pH of the polyetherimide composition can be 7 to 8, 9, 10, 11, 12, 13, or 14, for example 7 to 12, or 7.5 to 12, or 8 to 11. The pH of the polyetherimide composition can be determined by first dissolving 0.5 grams of the polyetherimide composition in 10 milliliters of methylene chloride and then mixing with 5 milliliters of water. The pH of the resulting aqueous layer can be measured and taken as the pH of the polyetherimide composition.

The polyetherimide composition can have a tensile strength at yield of greater than 84 megaPascal (MPa), determined according to ASTM D638.

The polyetherimide composition can have a heat distortion temperature at 1.82 MPa of greater than or equal to 150° C. as determined according to ASTM D648 on a 3.2 millimeter thick sample.

In some embodiments, in addition to the above described properties, the polyetherimide composition can optionally exhibit a percent transmittance of 0 to 50 at a thickness of 3.2 millimeters, as determined according to ASTM D1003.

In addition to the above-described properties (d), the polyetherimide compositions can have a melt index of 0.1 to 10 grams per minute (g/min), as measured by American Society for Testing Materials (ASTM) D1238 at 340 to 370° C., using a 6.7 kilogram (kg) weight. The polyetherimide can have a weight average molecular weight (Mw) of 1,000 to 150,000 grams/mole (Dalton), or 10,000 to 80,000 Dalton as measured by gel permeation chromatography, using polystyrene standards. The polyetherimide compositions can have an intrinsic viscosity greater than 0.2 deciliters per gram (dl/g), or 0.35 to 0.7 dl/g as measured in m-cresol at 25° C.

In an embodiment, the polyetherimide composition comprises greater than 40 to 5,000 ppm, or greater than 40 to 2,000 ppm, or greater than 40 to 1,000 ppm of the residual metal content comprising sodium, iron, molybdenum, magnesium, copper, calcium, chromium, potassium, nickel, or a combination comprising at least one of the foregoing, and 500 to 10,000 ppm of the residual solvent comprising ortho-dichlorobenzene, N-methylpyrrolidinone, dimethylacetamide, cresol, chlorobenzene, anisole, veratrole, trichloromethane, or a combination comprising at least one of the foregoing, and the polyetherimide composition exhibits a yellowness index of 130 to 250 at a thickness of 3.2 millimeters, as determined according to ASTM D1925.

The polyetherimides useful in the polyetherimide compositions comprise more than 1, for example 10 to 1000, or 10 to 500, or 10 to 50 structural units of formula (1)

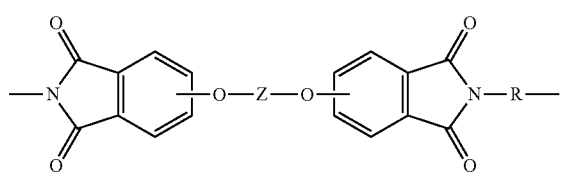

wherein each R is independently the same or different, and is each R is independently a substituted or unsubstituted $C_{6-20}$ aromatic hydrocarbon group, a substituted or unsubstituted straight or branched chain $C_{4-20}$ alkylene group, or a substituted or unsubstituted $C_{3-8}$ cycloalkylene group, in particular a divalent group of one or more of the following formulae (2)

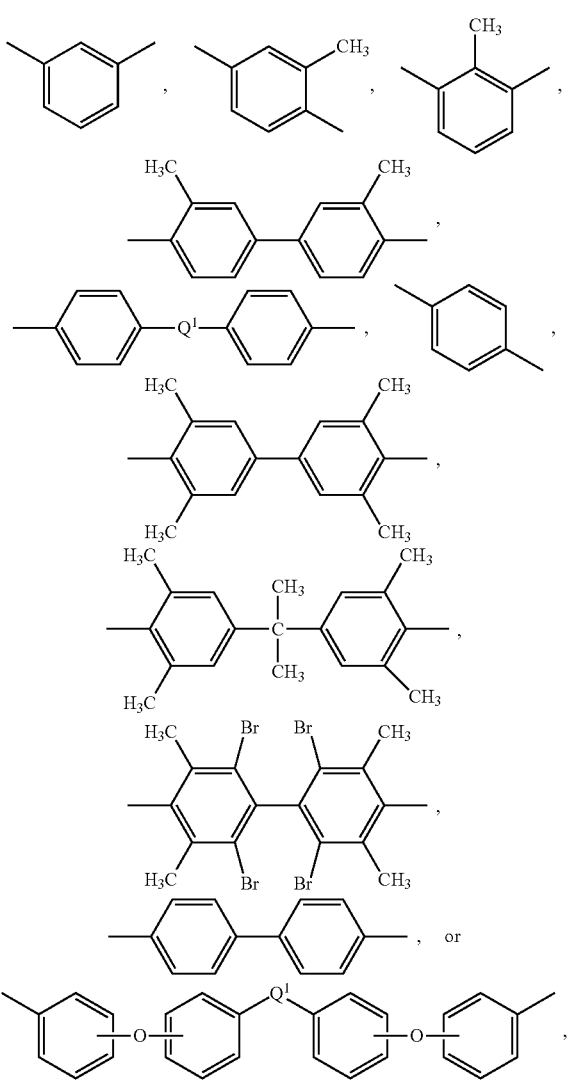

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diaryl sulfone, in particular bis(4,4'-phenylene)sulfone, bis(3,4'-phenylene)sulfone, bis(3,3'-phenylene)sulfone, or a combination comprising at least one of the foregoing.

Further in formula (1), each Z is independently an aromatic $C_{6-24}$ monocyclic or polycyclic group optionally substituted with 1 to 6 $C_{1-8}$ alkyl groups, 1-8 halogen atoms, or a combination comprising at least one of the foregoing. The divalent bonds of the —O—Z—O— group are in the 3,3', 3,4', 4,3', or the 4,4' positions. Exemplary groups Z include groups of formula (3)

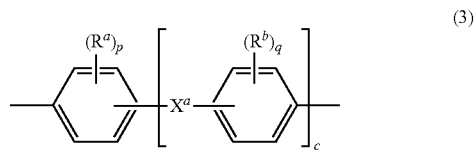

wherein $R^a$ and $R^b$ are each independently the same or different, and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3a)

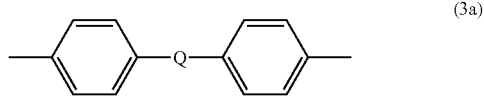

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene or p-phenylene and Z is a divalent group of formula (3a). Alternatively, R is m-phenylene or p-phenylene and Z is a divalent group of formula (3a) wherein Q is 2,2-isopropylidene. Alternatively, the polyetherimide copolymer optionally comprises additional structural imide units, for example imide units of formula (1) wherein R is as described in formula (1) wherein at least 50 mol % of the R groups are of formula (2) wherein $Q^1$ is —SO$_2$— and the remaining R groups are independently p-phenylene or m-phenylene or a combination comprising at least one of the foregoing; and Z is 2,2-(4-phenylene)isopropylidene.

In some embodiments, the polyetherimide optionally comprises additional imide units, for example imide units of formula (4)

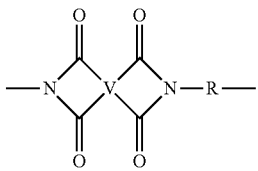

(4)

wherein R is as described in formula (1) and each V is the same or different, and is a substituted or unsubstituted $C_{6-20}$ aromatic hydrocarbon group, for example a tetravalent linker of the formulas

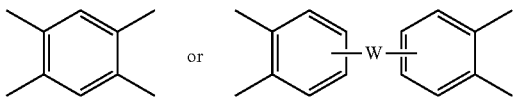

wherein W is a single bond, —S—, —C(O)—, —SO$_2$—, —SO—, or —C$_y$H$_{2y}$— wherein y is an integer from 1 to 5 or a halogenated derivative thereof (which includes perfluoroalkylene groups). These additional imide units can be present in amounts of 0 to 99 mol %, or 1 to 90 mol %, or 5 to 80 mol %, or 10 to 70 mol % of the total number of units. In some embodiments the additional imide units are present in amounts of 1 to 50 mole %, or 0 to 10 mol %, or 0 to 5 mol %, or 0 to 2 mol % of the total number of units. In some embodiments, no additional imide units are present in the polyetherimide.

Another aspect of this disclosure is a method for the manufacture of the polyetherimide composition. In a first embodiment, the method comprises reacting an aromatic bis(ether anhydride) of formula (5) or a chemical equivalent thereof, with an organic diamine of formula (6)

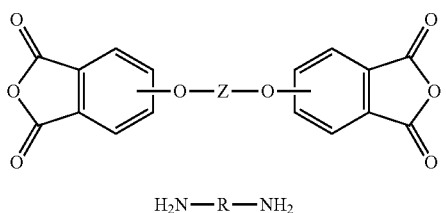

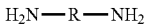

wherein Z and R are defined as described in Formulas (1) to (3a). Copolymers of the polyetherimides can be manufactured using a combination of an aromatic bis(ether anhydride) (5) and a different bis(anhydride), for example a bis(anhydride) wherein Z comprises a sulfone.

Illustrative examples of bis(anhydride)s include 3,3-bis [4-(3,4-dicarboxyphenoxy)phenyl]propane dianhydride (also known as bisphenol A dianhydride (BPADA)); 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include 1,4-butanediamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone, and bis(4-aminophenyl) ether. Combinations of these compounds can also be used, as well as isomers of the named compounds, $C_{1-3}$ alkylated or $C_{1-6}$ peralkylated derivatives, halogenated derivatives, or $C_{6-20}$ arylated derivatives, for example, methylated or permethylated derivatives such as methylated or permethylated 1,6-hexanediamine. In some embodiments the organic diamine is m-phenylenediamine, p-phenylenediamine, diaminodiphenylsulfone (including 4,4'-diaminodiphenylsulfone, 3,3'-diaminodiphenylsulfone, 3,4'-diaminodiphenylsulfone, or a combination comprising at least one of the foregoing, oxydianiline (including 4,4'-oxydianiline, 3,3'-oxydianiline, 3,4'-oxydianiline, and combinations comprising at least one of the foregoing), or a combination comprising one or more of the foregoing.

Generally in this embodiment, the method comprises contacting the aromatic bis(ether phthalic anhydride) (5) or a chemical equivalent thereof with the organic diamine (6), optionally in the presence of solvent, a catalyst, and an endcapping agent. The contacting can be at a temperature of 60° C. to 250° C., or 60° C. to 210° C., or 100° C. to 200° C., or 110° C. to 180° C., or 120° C. to 140° C., under an inert atmosphere with agitation, to produce a poly(amic acid), and heating and devolatilizing the poly(amic acid) to provide the polyetherimide. Atmospheric or super-atmospheric pressures can be used, for example up to 5 atmospheres, to facilitate the use of high temperatures without causing solvent to be lost by evaporation. The polymerization can be conducted for 0.5 to 30 hours, or 1 to 20 hours, more or 1 to 10 hours, or 2 to 8 hours, or 3 to 7 hours.

The solvent can be, for example, ortho-dichlorobenzene, N-methylpyrrolidinone, dimethylacetamide, dimethylformamide, cresol (e.g., ortho-cresol, meta-cresol, para-cresol), chlorobenzene, anisole, veratrole, dichlorotoluene, 1,2,4-trichlorobenzene, diphenyl sulfone, diphenylether, phenetole, dimethylsulfoxide, trichloromethane, acetone, methanol, ethanol, water, or a combination comprising at least one of the foregoing.

The catalyst can be a phase transfer catalyst, for example, as described in U.S. Pat. No. 9,127,127. For example, the catalyst can include guanidinium salts, pyridinium salts, imidazolium salts, tetra($C_{7-24}$ arylalkylene)ammonium salts, dialkyl heterocycloaliphatic ammonium salts, bis-alkyl quaternary ammonium salts, ($C_{7-24}$arylalkylene)($C_{1-16}$alkyl) phosphonium salts, ($C_{6-24}$aryl) ($C_{1-16}$alkyl) phosphonium salts, phosphazenium salts, and combinations comprising at least one of the foregoing.

The endcapping agent can be a monoanhydride or monoamine that limits molecular weight growth rate. Exemplary endcapping agents include certain monoamines (for example aniline), or monoanhydrides (for example phthalic anhydride), and the like. In an embodiment, a suitable endcapping agent is phthalic anhydride. Thus, when phthalic anhydride is included as an endcapping agent, the resulting polyetherimide comprises phthalimide as an end cap to the polymer chain. It should be understood, however, that the polyetherimides disclosed herein can be produced having any desired weight average molecular weight with any endcap.

In some embodiments, the aromatic bis(ether anhydride) (5) is obtained by reacting a dialkali metal salt of a dihydroxy aromatic compound of formula (7)

$$M^{+-}O-Z-O^{-+}M \qquad (7)$$

with a reactive substituted phthalimide of formula (8) under conditions effective to form a reaction mixture comprising an aromatic bisimide of formula (9).

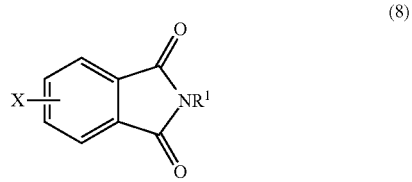

(8)

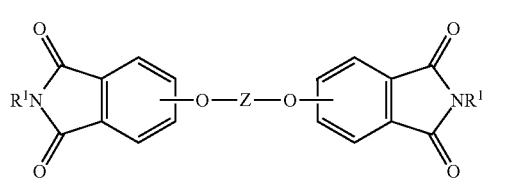

(9)

The aromatic bisimide (9) can then be reacted with phthalic anhydride in the presence of a catalyst and under conditions effective to provide the bis(ether anhydride) (5). which can be subsequently condensed under conditions effective to provide the aromatic bis(ether anhydride) (5).

In formulas (7), (8), (9), and (10), M is an alkali metal ion, for example, lithium, sodium, potassium, or a combination comprising at least one of the foregoing. In some embodiments, M is sodium. X is fluoro, chloro, bromo, iodo, nitro, or a combination comprising at least one of the foregoing. In some embodiments, X is nitro. $R^1$ is a monovalent $C_{1-13}$ organic group, preferably a $C_{1-4}$ alkyl group, for example a methyl group. Z is as defined in formula (1). In some embodiments, Z is 2,2-(4-phenylene)isopropylidene, and $R^1$ is a methyl group. The aromatic bisimide comprises 4,4'-bisphenol-A-bis-N-methylphthalimide, 3,4'-bisphenol-A-bis-N-methylphthalimide, 3,3'-bisphenol-A-bis-N-methylphthalimide, or a combination comprising at least one of the foregoing.

Alternatively, the aromatic bisimide (9) can be hydrolyzed under conditions effective to provide the corresponding tetraacid formula (10)

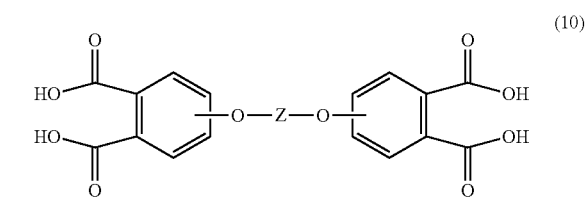

(10)

wherein Z is as described in formula (1), which is subsequently condensed to provide the bis(ether anhydride) (5). In some embodiments, Z is of formula (3a) wherein Q is isopropylidene. Hydrolyzing can be, for example, as described in U.S. Pat. No. 3,879,428, using an aqueous alkaline solution, for example comprising an alkali metal hydroxide such as sodium hydroxide. Reaction time can vary from 1 to 24 hours or more depending upon reactants, degree of agitation, temperature, pressure, and the like. The organic amine by-product can be removed by standard procedures, such as steam distillation, decantation (when butyl-derived materials are used), and the like. In addition, the rate of hydrolysis is accelerated by carrying out the reaction at above atmospheric pressures, and at temperatures of 100 to 220° C., for example, 120 to 200° C., or 140 to 180° C. The hydrolysis can be at a pressure of 0 MPa to 2 MPa. The hydrolyzed bisimide can be acidified with an acidic aqueous solution, for example comprising an inorganic acid to provide the tetraacid. The tetraacid can be condensed (i.e., dehydrated) under conditions effective to provide an aromatic bis(ether anhydride) (5), for example, by refluxing in the presence of a dehydrating agent such as acetic anhydride. In some embodiments, a temperature of 100 to 225° C. and a pressure of 0 MPa to 1 MPa can be used. The aromatic bis(ether phthalic anhydride) (5) can optionally be isolated or used directly for the preparation of the polyetherimide without further purification or isolation.

An alternative embodiment for manufacture of the above-described polyetherimide composition comprises contacting a substituted phthalic anhydride of the formula (11) with an organic diamine of formula (6)

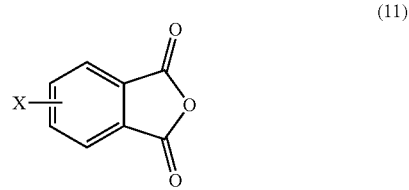

(11)

$$H_2N-R-NH_2 \qquad (6)$$

to provide a bis(phthalimide) is of formula (12)

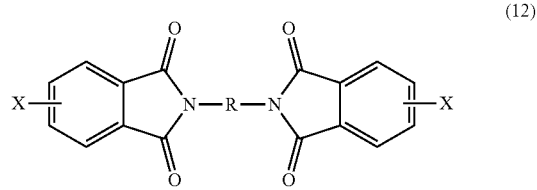

(12)

which is then polymerized with alkali metal salt of a dihydroxy aromatic compound of formula (7)

$$M^+\text{—}O\text{—}Z\text{—}O^-{}^+M \quad (7)$$

to provide the polyetherimide composition. In the foregoing formulas (11), (6), (12), and (7), X is a leaving group (such as a nitro group or a halogen). In an embodiment, X is a nitro group or a halogen, specifically nitro, fluoro, chloro, bromo, or iodo. In some embodiments, X is nitro. In some embodiments, X is chloro. A combination of different X groups can be used. R is as defined in formula (6) above, Z is as described in formula (1) above, and M is as defined in formula (7) above.

The bis(phthalimide)s (12) can be prepared by contacting the substituted phthalic anhydride (11) with the organic diamine (6) at a temperature of least at 130° C., or 150° to 275° C., or 160 to 250° C. Atmospheric or super-atmospheric pressures can be used, for example up to 5 atmospheres, to facilitate the use of high temperatures without causing solvent to be lost by evaporation. The reaction of the substituted phthalic anhydride with the organic diamine to form bis(phthalimide) can be conducted for 0.5 to 30 hours, or 1 to 20 hours, or 1 to 10 hours, or 2 to 8 hours, or 3 to 7 hours. The resulting bis(phthalimide) reaction mixture can be used for subsequent polymerization without purification. Alternatively, the bis(phthalimide) reaction mixture can be subject to further purification before polymerization.

Polymerization to provide the polyetherimide can be effected by contacting the bis(phthalimide) with the alkali metal salt of a dihydroxy aromatic compound (7), and can be in the presence of a solvent comprising ortho-dichlorobenzene, N-methylpyrrolidinone, dimethylacetamide, dimethylformamide, chlorobenzene, anisole, veratrole, dichlorotoluene, 1,2,4-trichlorobenzene, diphenyl sulfone, diphenylether, phenetole, dimethylsulfoxide, sulfolane, or a combination comprising at least one of the foregoing. Polymerization can be conducted at least 110° C., or 150° to 275° C., or 160 to 250° C. Atmospheric or super-atmospheric pressures can be used, for example up to 5 atmospheres, to facilitate the use of high temperatures without causing solvent to be lost by evaporation. The polymerization can be conducted for 0.5 to 30 hours, or 1 to 20 hours, or 1 to 10 hours, or 2 to 8 hours, or 3 to 7 hours.

In this embodiment, polymerization can be in the presence of a catalyst. A wide variety of catalysts can be used, for example, various phosphonium, ammonium, guanidinium, and pyridinium salts can be used. The catalyst can be a hexa($C_{1-12}$ alkyl)guanidinium salt, a tetra($C_{1-12}$ alkyl) ammonium salt, a tetra($C_{1-12}$alkyl) phosphonium salt, or a tetra($C_{6-20}$ aryl) phosphonium salt. For example, the catalyst can be tetraethylammonium bromide, tetraethylammonium acetate, tetrabutylammonium bromide, tetrapropylammonium bromide, tetrabutylammonium chloride, tetrabutylammonium fluoride, tetrabutylammonium acetate, tetrahexylammonium chloride, tetraheptylammonium chloride, Aliquat 336 phase transfer catalyst (methyltrioctylammonium chloride, manufactured by the General Mills Company), tetrabutylphosphonium bromide, tetraphenylphosphonium bromide, tetrabutylphosphonium chloride, hexaethylguanidinium chloride, and the like. A pyridinium salt, for example a bis-aminopyridinium salt can also be used.

The catalyst can be a quaternary salt or a bis-quaternary salt. Among the quaternary salts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is $Cl^-$, $Br^-$, a $C_{1-8}$ alkoxy or a $C_{6-18}$ aryloxy. Among the bis-quaternary salts that can be used are those of the formula $(R^4)_kQ^+(R^3)_m{}^-Q(R^4)_k(X^2)_2$ wherein each $R^3$ is independently a divalent $C_{1-60}$ hydrocarbon group, all $R^3$ taken together contain 4-54 carbon atoms, each $R^4$ is independently a $C_{1-12}$ hydrocarbon group, Q is nitrogen or phosphorus, preferably nitrogen, $X^2$ is an anion-forming atom or group, k is an integer from 1 to 3, and m is 4-k, wherein at least three of $R^3$ and $R^4$ groups attached to each Q atom are aliphatic or alicyclic. In particular, each $R^3$ can be a divalent $C_{1-18}$ alkylene, $C_{3-8}$ cycloalkylene, or $C_{6-18}$ aromatic group such as ethylene, propylene, trimethylene, tetramethylene, hexamethylene, octamethylene, decamethylene, dodecamethylene, cyclohexylene, phenylene, tolylene, or naphthylene, or a $C_{3-12}$ divalent heterocyclic group derived from a compound such as pyridine or indole. In some embodiments, each $R^3$ is $C_{1-12}$ alkylene, or $C_{3-8}$ alkylene. Preferably, only one $R^3$ group is present (i.e., m is 1 and each k is 3) and it contains 5-10, or 6 carbon atoms. Illustrative $R^4$ groups are methyl, ethyl, n-propyl, isopropyl, n-butyl, isobutyl, n-hexyl, n-heptyl, cyclopentyl, cyclohexyl, methylcyclohexyl, phenyl, tolyl, 2-(1,4-dioxanyl) and 2-furyl. Preferably, the $R^4$ groups are all alkyl, for example $C_{1-4}$ n-alkyl groups. The $X^2$ can be any anion that is stable under the conditions used; suitable anions include chloride, bromide, sulfate, p-toluenesulfonate, and methanesulfonate, preferably bromide. The value of the integer k can be from 1 to 3, and the value of m is 4-k. In some embodiments, each k is 3 and m is 1. In the some embodiments, all of the $R^3$ and $R^4$ groups are aliphatic. Illustrative bis-quaternary salts of this type include those in which $R^3$ is a polymethylene chain from trimethylene to dodecamethylene, each $R^4$ is either n-butyl or n-hexyl, Q is nitrogen, $X^2$ is bromide, each k is 2 and m is 2; the compound in which each $R^3$ is ethylene, $R^4$ is n-butyl, Q is nitrogen, $X^2$ is bromide, each k is 1 and m is 3; and the compound in which $R^3$ is hexamethylene, each $R^4$ is n-butyl, Q is phosphorus, $X^2$ is bromide, each k is 3 and m is 1. The catalyst is preferably a quaternary ammonium salt, guanidinium salt, pyridinium salt, imidazolium salt, or a combination comprising at least one of the foregoing, more preferably wherein the catalyst is a hexaalkylguanidinium salt, even more preferably wherein the catalyst is hexaethylguanidinium chloride.

Further, in this embodiment, polymerization can also be conducted in the presence of an endcapping agent as described above, or a monophenol endcapping agent, for example a phenol, preferably sodium phenoxide, more preferably sodium para-cumyl phenol. Thus, when phenol is included as an endcapping agent, the resulting polyetherimide comprises phenyl ether groups as an end cap to the polymer chain. It should be understood, however, that the polyetherimides disclosed herein can be produced having any desired weight average molecular weight (Mw) with any end cap.

The polyetherimide compositions can be used in the formulation of polymer compositions, particularly thermoplastic polymer compositions, for a wide variety of purposes. As used herein "polymer compositions" comprised the polyetherimide composition and one or more additional polymers or additives known for use in polymer compositions. In some embodiments the polymer composition excludes any polymer other than the polyetherimide.

However, in other aspects, a polymer composition, in particular a thermoplastic composition comprises the polyetherimide composition and a polymer different from the polyetherimide of the polyetherimide composition. The polyetherimide composition can be present in an amount of 1 to 99 wt %, based on the total weight of the polymer composition or thermoplastic composition. Likewise, the polymer different from the polyetherimide can be present in an amount of 1 to 99 wt %, based on the total weight of the polymer composition or the thermoplastic composition.

The polymer different from the polyetherimide can be, for example, polyacetal, poly($C_{1-6}$ alkyl)acrylate, polyacrylamide, polyamide, polyamideimide, polyanhydride, polyarylate, polyarylene ether, polyarylene sulfide, polyarylsulfone, polybenzothiazole, polybenzoxazole, polycarbonate, polyester, polyetheretherketone, polyetherketoneketone, polyetherketone, polyethersulfone, poly($C_{1-6}$ alkyl)methacrylate, polymethacrylamide, polynorbornene, polyolefin, polyoxadiazole, polyoxymethylene, polyphthalide, polysilazane, polysiloxane, polystyrene, polysulfide, polysulfonamide, polysulfonate, polysulfone, polythioester, polytriazine, polyurea, polyurethane, polyvinyl alcohol, polyvinyl ester, polyvinyl ether, polyvinyl halide, polyvinyl ketone, polyvinyl thioether, a fluoropolymer (e.g., polyvinylidene fluoride, perfluoroalkoxy, polytetrafluoroethylene), or a combination comprising at least one of the foregoing. The polymer different from the polyetherimide can be a polyarylene ether (e.g., polyphenylene ether), polyaryletherketone (e.g., polyetherketone (PEK), polyetheretherketone (PEEK), polyetherketoneketone (PEKK), polyetheretherketoneketone (PEEKK), polyetherketoneetherketoneketone (PEKEKK), and the like), polyphenyl sulfone, polyester, polycarbonate, polyarylene sulfide, fluoropolymers, polyamide, polyamideimide, polyethersulfone, or a combination comprising at least one of the foregoing.

In other embodiments the polymer compositions include one or more additives (i.e., one or more components present in the composition by virtue of being added, rather than a manufacturing or other residue). An additive can be selected to achieve a desired property, with the proviso that the additive is also selected to not significantly adversely affect a desired property of the polymer composition.

The polymer composition can include a filler, for example a reinforcing filler. Possible fillers include for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (atmospheres), kaolin, whiskers of silicon carbide, alumina, boron carbide, iron, nickel, or copper, continuous and chopped carbon fibers or glass fibers, carbon nanofibers, carbon nanotubes, carbon black, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch, lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, perfluoroalkoxy, and poly(vinyl alcohol), as well combinations comprising at least one of the foregoing fillers or reinforcing agents. The fillers can be coated with a layer of metallic material to facilitate conductivity, or surface treated with silanes to improve adhesion and dispersion with the polymer matrix. The filler can comprise glass (e.g., glass flakes, glass spheres, or glass fibers, including E, ECR, S, and NE glasses), talc (including fibrous, modular, needle shaped, and lamellar talc), carbon (e.g., carbon fibers), or a combination comprising at least one of the foregoing. The polymer composition can include a nano-size filler, or a filler having a particle size less than or equal to 100 nanometers, for example inorganic materials such as titanium oxide, cerium oxide, zinc oxide, and the like. Fillers are used in amounts of 1 to 80 wt %, or 5 to 60 wt %, or 5 to 40 wt %, or 5 to 30 wt %, or 5 to 20 wt %, or 10 to 60 wt %, or 15 to 40 wt %, or 20 to 35 wt %, each based on the total weight of the composition.

The polymer composition can comprise a colorant, for example a pigment or dye. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, based on the total weight of the polymer composition. naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of up to 25 wt %, for example 0.01 to 25 wt %, or 0.01 to 10 wt %.

Dyes are generally organic materials and include coumarin dyes such as coumarin 460 (blue), coumarin 6 (green), Nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of up to 5 wt %, for example 0.0001 to 5 wt %, or 0.0001 to 2.5 wt %, or 0.0001 to 1 wt %, or 0.0001 to 0.5 wt %, based on the total weight of the polymer composition. In some embodiments, however, the polymer composition can exclude a colorant (i.e., the composition can exclude a pigment or a dye).

Other additives that can be used include a particulate filler, antioxidant, heat stabilizer, light stabilizer, ultraviolet light stabilizer, UV absorbing additive, plasticizer, lubricant, release agent, antistatic agent, anti-fog agent, antimicrobial agent, colorant, surface effect additive, radiation stabilizer, flame retardant, anti-drip agent, or a combination comprising at least one of the foregoing. The additives are used in the amounts generally known to be effective. For example, the total amount of the additives (other than any impact modifier, filler, or reinforcing agent) can be 0.001 to 10.0 wt %, or 0.01 to 5 weight, each based on the total weight of the polymer components in the thermoplastic composition.

The polymer composition can be prepared by known methods. In some embodiments, the polymer composition is prepared by melt-mixing or a combination of dry-blending and melt-mixing. An additive composition or individual additives can be mixed at a suitable time during the mixing of the components for forming the thermoplastic composition. Melt-mixing can be performed in single or twin screw type extruders or similar mixing devices that can apply a shear and heat to the components. Melt-mixing can be performed at temperatures greater than or equal to the melting temperatures of the polymer components and less than the degradation temperatures of either of the polymer components. The components can be added simultaneously or sequentially, or through the use of one or more master batches. A vacuum can be applied to the melt through one or more vent ports in the extruder to remove volatile impurities in the composition.

The polyetherimide composition or the polymer composition as defined above, in particular the thermoplastic composition, can each independently be used in the preparation of various articles. The compositions can be formed in articles using any suitable techniques, for example, melt-processing techniques. Melt-molding methods can include injection molding, extrusion molding, blow molding, rotational molding, coining, and injection blow molding. For example, the melt molding method can be injection molding. The compositions can be formed into sheets or films by casting, blowing, or extruding. These can be further thermoformed into articles and structures that can be oriented from the melt or at a later stage in the processing of the compositions. The compositions can be over-molded onto an article made from a different material or by a different process. The articles can also be formed using techniques such as compression molding or ram extruding. The articles can be further formed into other shapes by machining. Exemplary articles include a fiber, a film, a sheet, a foam, a filament, a molded article, an extruded article, or a powder.

The polyetherimide compositions are further illustrated by the following non-limiting examples.

EXAMPLES

Examples of the invention are designated by numbers, while letters designate comparative control Examples as shown in Table 1.

TABLE 1

| Polymer | Description | Example(s) | Source |
| --- | --- | --- | --- |
| PEI-A | Poly(etherimide) comprising structural units derived from phenylene diamine and BPA-dianhydride, available as ULTEM 1010 [condensation process] | A | SABIC |
| PEI-B | Poly(etherimide) comprising structural units derived from chlorophthalic anhydride and BPA-disodium salt [ether-forming polymerization process] | B | SABIC |
| PEI | Poly(etherimide) comprising structural units derived from phenylene diamine and BPA-dianhydride [condensation process] | 1-3 | SABIC |
| PEI | Poly(etherimide) comprising structural units derived from chlorophthalic anhydride and BPA-disodium salt [ether-forming polymerization process] | 4-7 | SABIC |

Samples for ASTM property testing (tensile, flame and heat deflection temperature (HDT)) were molded on a 180-ton injection-molding machine with a 5.25 oz. barrel. The compositions were molded with a melt temperature of 370-380° C. after 8 hours of drying in a dehumidifying dryer at 150° C. to moisture levels less than 0.02 wt %. An oil-thermolator was used to control the mold surface temperature to 150° C. Screw rotation ranged from 60-80 rpm with 0.3 MPa back pressure without screw decompression after screw recovery. The molding cycle time was 32-35 seconds, and all of the injection molded test specimens were molded in accordance with ASTM test A molding cycle time of 32-35 seconds resulted and was dependent on the ASTM test specimen molded.

Unless indicated otherwise, all tests are the tests in effect in the year 2010. Tensile properties were evaluated using a ASTM D638 standard test method with a Type I test specimen and rate of 0.2 inch/min (5 mm/min), while heat deflection temperature used ASTM D648 with 264 psi (1.8 MPa) and 0.125 inch (3.18 mm) thick un-annealed test sample. All molded samples were conditioned for at least 48 hours at 23° and 50+/−5% relative humidity (RH) prior to testing. Flame bars at 1.5 mm thickness were molded and tested in accordance with UL-94 V-0 flammability test method with samples conditioned for 48 hours at 23 and 50+/−5% RH and another set of bars for 168 hours at 70° prior to testing. All flame testing was completed by an Underwriters Laboratory (UL) certified flame lab.

A rectangular color chip was molded to determine percent transmission (% T) and haze per ASTM D1003 and yellowness index (YI) by ASTM D6290. The color chip measured 3 inch (76 mm) by 2 inch (51 mm) in length and width with two thickness transitions of 0.062 inch (1.57 mm) and 0.125 inch (3.18 mm) present in equal amounts. Carbon black pigment was mixed with neat resin fines in ratios of 0, 22, 44, 110, and 220 ppm and well mixed until a uniform dispersion of pigment was obtained in the neat resin to form a blended mixture. The mixture was introduced into the feed throat of the molding machine, which subsequently resulted in molded parts of varying degrees of translucency and light transmission dependent on the initial loading level of carbon black in the neat resin. The molded part was processed using the previously described molding conditions.

Test Methods

Inductively coupled plasma mass spectrometry (ICP-MS) was used to determine ppm levels of metals, halides, and phosphate in the polymeric material after microwave digestion under pressure and temperature using sulfuric and nitric acid. Metals detected consisted of Al, Ca, Cr, Cu, Fe, K, Mg, Na, Ni, Ti, Zn, Mn, and P.

Ion Chromatography (IC) used to determine extractable free anions from the polymer after the resin was dissolved in methylene chloride and extracted with deionized water. The anions detected and reported are halide, phosphate, sulfate, nitrite, and nitrate.

Gas Chromatography (GC) was used to quantify phosphite stabilizer and residual ortho-dichlorobenzene levels.

Gel permeation Chromatography (GPC) was used to determine weight average molecular weight (Mw), number average molecular weight (Mn), polydispersity (PDI), and ratio of z-average molecular weight (Mz) to weight average molecular weight, (PDI*).

The pH of the polyetherimide composition was determined by dissolving 0.5 grams in 10 milliliters of methylene chloride and mixing with 5 milliliters of deionized water. The pH of the resulting aqueous layer was measured and reported as the pH.

Residual reactive anhydride and amine end groups were determined spectroscopically.

Ultraviolet-visible-near IR (UV-Vis) spectroscopy was used to measure percent transmission as a function of wavelength from 200 to 1800 nm. A molded rectangular color chip at 0.062 inch (1.57 mm) thickness was used for the analysis.

Melt flow rate (MFR) and melt volume rate (MVR) were measured in accordance with ASTM D1238 at 337° and 6.7 kgf after drying for 4 hours at 150 to a moisture level less than 0.02 wt %.

Capillary Rheometry was used to measure melt viscosity at 380 and shear rates up to 7,000 1/secs. The ratio in melt viscosities at 100 1/sec to 5000 1/sec were reported. Resin samples were dried for at least 4 hours at 150° C. to a moisture level less than 0.02 wt % prior to testing.

Glass transition (Tg) temperature was measured using differential scanning calorimetry (DSC) on polymer pellets at a heating rate of 20° C./min to 300° C. with result reported on the second scan.

Examples 1-7 and Comparative Examples A and B

Material properties the polyetherimide compositions for inventive Examples 1 to 7 and comparative Examples A and B are reported in Table 2.

TABLE 2

| Property | Units | Ex. A | Ex. B | Ex. 1 | Ex. 2 | Ex. 3 | Ex. 4 | Ex. 5 | Ex. 6 | Ex. 7 |
|---|---|---|---|---|---|---|---|---|---|---|
| Mw | KDa | 46.5 | 45.9 | 48.0 | 51.3 | 56.9 | 61.5 | 45.0 | 44.6 | 44.7 |
| PDI |  | 2.1 | 2.5 | 2.1 | 2.1 | 2.5 | 2.9 | 2.4 | 2.5 | 2.4 |
| Tg | ° C. | 219 | 218 | 218 | 219 | 220 | 221 | 218 | 218 | 216 |
| MFR | g/10 min | 18.0 | 19.8 | 17.3 | 11.1 | 11.2 | 4.9 | 21.8 | 22.9 | 23.0 |
| MVR | cm$^3$/10 min | 15.5 | 17.1 | 14.9 | 9.6 | 9.6 | 4.2 | 18.8 | 19.7 | 19.8 |

Chemical Analysis.

Chemical analysis was performed for the compositions of Examples 1-7 and comparative Examples A and B. The purpose of this analysis was to show the chemical characteristics of polyetherimide compositions with residual and impurity levels exceeding comparative commercial polyetherimide compositions while still remaining useful and valuable. Table 3 reports the measured amounts of residuals, impurities, and stabilizers for the examples.

TABLE 3

| Chemical Analysis | Units | Ex. A | Ex. B | Ex. 1 | Ex. 2 | Ex. 3 | Ex. 4 | Ex. 5 | Ex. 6 | Ex. 7 |
|---|---|---|---|---|---|---|---|---|---|---|
| Residual Metals | ppm | 31 | 28 | 98 | 41 | 57 | 61 | 236 | 187 | 229 |
| Sulfate anion | ppm | <0.5 | <0.5 | 0.73 | 0.97 | <0.5 | <0.5 | <0.5 | <0.5 | <0.5 |
| Nitrite/Nitrate anion | ppm | <0.5 | <0.5 | <0.5 | <0.5 | <0.5 | <0.5 | <0.5 | <0.5 | <0.5 |
| Residual Solvent | ppm | 383 | 345 | 268 | 442 | 331 | 575 | 201 | 319 | 168 |
| Phosphite Stabilizer | ppm | 263 | nd | 570 | 92 | nd | nd | nd | nd | nd |
| Residual Anhydride | mol % | 0.15 | 0.14 | 0.09 | 0.24 | 0.17 | 0.02 | 0.07 | 0.15 | 0.07 |
| Residual Amine | mol % | 0.03 | 0.00 | 0.00 | 0.07 | 0.00 | 0.00 | 0.00 | 0.00 | 0.00 |

Examples 1 to 7 were found to include metal impurities that ranged from 41 to 236 ppm, which at the high end were an order of magnitude greater than the 31 and 28 ppm metal impurity content for comparative Examples A and B, respectively. In addition, residual ortho-dichlorobenzene solvent was found at 575 ppm for Example 4, although the residual solvent amount was less than 500 ppm for Examples 1-3 and 5-7, and this was similar to comparative Examples A and B.

The amount of residual phosphite stabilizer varied significantly between compositions and ranged from non-detectable (nd) to 570 ppm, with Example 1 containing the highest residual of phosphite stabilizer. Extractable amounts of sulfate, nitrate, and nitrite anions were observed to be less than 0.5 ppm for all of the examples, with exception of Examples 1 and 2, which contained elevated sulfate anion levels of 0.73 and 0.97 ppm, respectively.

The amount of residual reactive end groups, derived from anhydride and amine groups in the polyetherimide compositions, were evaluated and reported. Example 2 contained 0.24 mole percent residual anhydride end groups which exceeded the corresponding levels found in comparative Examples A and B, which contained 0.15 and 0.14 ppm, respectively.

Notably, chemical characterization of Examples 1-7 revealed that the compositions are exceptional in that they have two or more categories in which the chemical compositions do not attain the high-purity standards of the comparative Examples A and B, yet the compositions of Examples 1-7 remain viable polyetherimide compositions for use in commercial applications, as described further below.

Mechanical and Physical Properties.

The mechanical and physical properties of the compositions of Examples 1-7 and comparative Examples A and B were evaluated and compared. The results are presented in Table 4.

and/or impurities in Examples 1 to 7. The measured pH values for Examples 1 to 7 spanned from 5.0 to 8.1 and overlapped with the pH values for comparative Examples A and B. In addition, the rheological properties as represented by PDI* and melt viscosity ratio (100 l/sec to 5000 l/sec at 380° C.) were calculated and determined to be as high as 1.58 and 6.6 for Examples 3 and 4, respectively. However, it should be noted that a polyetherimide composition with a high melt viscosity ratio is more shear thinning, and at higher shear rates that are typical of injection molding, may have a longer flow length with less injection pressure and, therefore, is highly desirable compared to a composition with a lower melt viscosity ratio.

Injection molding of ASTM-compliant specimens to measure tensile strength and heat deflection temperature using standard polyetherimide composition processing conditions revealed that these properties were unchanged, primarily as a result of the noted rheological similarities between Examples 1 to 7 and comparative Examples A and B. The tensile strength at yield and heat deflection temperatures ranged from 107 to 109 MPa and 191 to 195° C. for each of the polyetherimides evaluated. This result exemplified that the presence of residuals and impurities in Examples 1 to 7 still provided polyetherimide compositions with mechanical properties that are similar to those observed for Examples A and B.

Residual Metal Content.

The purpose of this evaluation was to identify and quantify the residual metal content in polyetherimide compositions produced by the chloro-displacement process to show how it can vary significantly depending on how the material is polymerized. Results are presented in Table 5 for Examples 4 to 7 and comparative Example B.

TABLE 4

| Property | Units | Ex. A | Ex. B | Ex. 1 | Ex. 2 | Ex. 3 | Ex. 4 | Ex. 5 | Ex. 6 | Ex. 7 |
| --- | --- | --- | --- | --- | --- | --- | --- | --- | --- | --- |
| YI at 3.2 mm | | 49 | 123 | 147 | 85 | 93 | 94 | 116 | 101 | 115 |
| Haze at 3.2 mm | % | 0.7 | 3.3 | 2.3 | 1.1 | 1.3 | 5.6 | 2.1 | 1.7 | 45.4 |
| PDI* (Mz/Mw) | | 1.47 | 1.52 | 1.52 | 1.49 | 1.58 | 1.53 | 1.53 | 1.54 | 1.51 |
| Viscosity Ratio (380° C., 100/5000 l/sec) | | 3.4 | 3.9 | 3.6 | 4.6 | 6.0 | 6.6 | 3.4 | 3.3 | 3.4 |
| pH | | 6.3 | 5.0 | 6.5 | 8.1 | 5.5 | 5.0 | 5.2 | 5.0 | 5.2 |
| Tensile Yield Strength | MPa | 108 | 109 | 108 | 108 | 108 | 109 | 107 | 109 | 107 |
| HDT (1.82 MPa, 3.2 mm) | ° C. | 191 | 195 | 191 | 193 | 194 | 195 | 194 | 191 | 191 |

The results showed that the polyetherimide compositions of Examples 1-7, despite having elevated amounts of residuals and impurities, still demonstrated useful material properties and may, for instance, be preferred over the polyetherimide compositions of comparative Examples A and B for some commercial applications.

For example, the yellowness index (YI) of Example 1 was 147, while Example 7 had a haze of 45.4%, both measured at thickness of 3.2 mm. Although the appearance properties for compositions of Examples 1 and 7 were much different than the appearance properties for comparative Examples A and B, the appearance properties of Examples 1 and 7 are nonetheless advantageous in applications requiring reduced light transmittance or a darker appearance without the need to include additional additives such as pigments or dyes.

The pH of the compositions was evaluated, since it may be affected by and indicative of the presence of residuals

TABLE 5

| Metal | Units | Ex. B | Ex. 4 | Ex. 5 | Ex. 6 | Ex. 7 |
| --- | --- | --- | --- | --- | --- | --- |
| Aluminum | ppm | nd | nd | 31 | 3 | 4 |
| Calcium | ppm | 1.1 | 4.9 | 7 | 4 | 5.5 |
| Chromium | ppm | nd | 1 | 0.6 | 2.3 | 1.6 |
| Copper | ppm | nd | nd | 8 | nd | nd |
| Iron | ppm | nd | 26.7 | 108 | 150 | 35 |
| Potassium | ppm | 4 | 3.5 | 5.6 | 5 | 8.5 |
| Magnesium | ppm | nd | nd | 0.4 | 0.2 | 0.2 |
| Sodium | ppm | nd | 1 | 2.7 | 1.7 | 111 |
| Nickel | ppm | nd | 2 | 50 | 2.7 | 2.3 |
| Titanium | ppm | nd | nd | 2.2 | 0.27 | 0.04 |
| Zinc | ppm | 2.1 | 1.3 | 2.3 | 1.3 | 1.7 |
| Manganese | ppm | nd | nd | 0.26 | 0.51 | 0.07 |
| Phosphorous | ppm | 21 | 21 | 18.3 | 16.2 | 59.3 |
| Totals | ppm | 28.2 | 61.4 | 236.4 | 187.2 | 229.2 |

A total of 13 metals were quantified with non-detect (nd) indicated if an element was not present in the composition evaluated. The total metal content ranged from 61.4 to 236.4 ppm for Examples 4 to 7 as compared to 28.2 ppm for comparative Example B. A substantial, 10-fold increase in metal content over comparative Example B was found in Example 5, which was mainly iron, nickel, and aluminum at 108, 50, and 31 ppm, respectively. Example 6 had 150 ppm of iron, which was a large percentage of the overall total metal content of 187.2 ppm in the material. In contrast, for Example 7, the largest contributing metal impurity was sodium at 111 ppm out of a total of 229.2 ppm of metals. This result explains why the polyetherimide composition of Example 7 appeared hazy and translucent whereas the other polyetherimide compositions were transparent. Comparative Example B was without a significant amount of metal impurities with the exception of phosphorous. Residual metal impurities may come from many different sources that include, for example, raw materials, processing, and handling equipment. However, even with these observed levels of metal impurities, the polyetherimide compositions of Examples 4 to 7 remain useful and in some cases highly desirable for many applications.

Flammability Testing.

The quantity of residual metals and the flammability test results for the polyetherimide compositions of Example 5 and comparative Example B were evaluated and compared. The results are presented in Table 6.

TABLE 6

| Properties Part Conditioning | Units | Ex. B | Ex. 5 |
|---|---|---|---|
| | | >48 hr at 23 ± 2° C., 50 ± 5% RH | |
| Samples | number | 10 | 10 |
| Thickness (avg.) | mm | 1.433 | 1.436 |
| After flame time (t1) | sec | 7 | 7 |
| After flame time (t2) | sec | 7 | 10 |
| Total flame time (t1 + t2) | sec | 24 | 17 |
| Afterglow Present | yes/no | no | no |
| Samples dripped | number | 4 | 0 |
| Comments | UL-94 code | 4 | 2 |
| | | 168 ± 2 hr at 70 ± 2° C. | |
| Samples | number | 10 | 10 |
| Thickness (avg.) | mm | 1.436 | 1.436 |
| After flame time (t1) | sec | 9 | 8 |
| After flame time (t2) | sec | 14 | 10 |
| Total flame time (t1 + t2) | sec | 23 | 18 |
| Afterglow Present | yes/no | no | no |
| Samples dripped | number | 2 | 0 |
| Rating | | V2 | V0 |

The above data demonstrates that a polyetherimide composition with a significant level of residual metals will result in an improvement in Underwriters Laboratory UL-94 V0 flammability testing as compared to a polyetherimide composition with fewer impurities and of similar molecular weight (Mw). Example 5 has a total residual metal content of 236.4 ppm, which is 8.4 times greater than the total residual metal content of comparative Example B. The polyetherimide composition for each of Example 5 and comparative Example B was evaluated using an industry standard for testing plastic compositions for flammability. As presented in Table 6, after flame time, also known as flame out time, was the time that the vertical test specimens remained burning after an ignition source had been removed, and these were reported for the first and second application of a flame in accordance with the test standard. In addition, test code 2 and 4 of UL-94 were used and correspond to the status of the burning samples and as to whether the samples had not dripped or had dripped and ignited the test cotton, respectively. Example 5 was significantly better in performance than comparative Example B, having a flame out time of 17 and 18 seconds as compared to 24 and 23 seconds, all measured after conditioning for 48 hours at 23° C. and 50% RH and 168 hours at 70° C., respectively. In addition, none of the specimens of Example 5 dripped during testing, whereas the specimens of comparative Example B included 6 samples that dripped, including 4 that ignited the test cotton. Example 5 obtained a V0 rating at 1.5 mm thickness as compared to comparative Example B which obtained a lesser rating of V2. A V0 flame rating is a highly desirable property and is commercially valuable, and can be attributed to the presence of elevated levels of impurities in Example 5.

Optical Properties.

The yellowness index (YI), light transmittance, and haze for the polyetherimide compositions of Examples 1 and 7 and comparative Example A were evaluated and compared. The results are presented in Table 7.

TABLE 7

| Properties | Units | Thickness (mm) | Ex. A | Ex. 1 | Ex. 7 |
|---|---|---|---|---|---|
| YI | | 1.6 | 37 | 111 | 85 |
| | | 3.2 | 49 | 147 | 115 |
| Haze | % | 1.6 | 0.5 | 2.0 | 27.7 |
| | | 3.2 | 0.7 | 2.3 | 45.4 |
| Transmittance | % | 1.6 | 79 | 34 | 59 |
| | | 3.2 | 77 | 20 | 41 |

The above data shows the relationship that yellowness index (YI) has on the percent light transmittance and the effect that haze has on the optical properties as a function of thickness. Comparative Example A had a YI of 37 and 49 at 1.6 and 3.2 mm thickness, respectively, which resulted in transmittance of 79% and 77%, respectively. In addition, the YI for comparative Example A was inversely related to the percent transmittance at a constant thickness in view of Example 1 at 3.2 mm with a YI of 147 and percent transmittance of 20. This clearly shows the inverse relationship and result of a composition with a high YI having a low percent transmittance. These properties can be advantageous in applications requiring absence of light transmittance, especially in polyetherimide applications for which no additives or dyes have been included or are indicated. Furthermore, the effect of haze can have a similar result, as shown with Example 7 have a 45.4% haze, a percent transmittance of 41%, and YI of 115 at a 3.2 mm thickness. The presence of haze on a molded part or article such that it is translucent or has some opacity can be advantageous to assist in visual assessment to ensure a pristine surface prior to additional secondary operations such as applying a coating or metallization. The interrelationships of optical properties such as light transmittance with yellowness index, haze, and thickness can be used constructively, especially in applications where the absence of light is desired, translucency, opacity, or a minimum amount of pigment or dyes are to be used to color the material.

The light transmittance tabulated as a function of carbon black loading for Example 1 and comparative Example A were evaluated and compared. The results are presented in Table 8.

TABLE 8

| Carbon black (ppm) | Ex. A % T (1.6 mm thick) | Ex. 1 % T (1.6 mm thick) | Ex. A % T (3.2 mm thick) | Ex. 1 % T (3.2 mm thick) | Ex. A YI (1.6 mm thick) | Ex. 1 YI (1.6 mm thick) | Ex. A YI (3.2 mm thick) | Ex. 1 YI (3.2 mm thick) |
|---|---|---|---|---|---|---|---|---|
| 0 | 77.8 | 33.3 | 69.0 | 16.8 | 37.1 | 111.5 | 56.3 | 150.5 |
| 22 | 49.2 | 21.3 | 29.5 | 7.2 | 46.7 | 116.9 | 70.5 | 157.6 |
| 44 | 27.8 | 13.1 | 10.4 | 2.9 | 58.9 | 123.2 | 87.9 | 165.5 |
| 110 | 7.4 | 2.9 | 0.9 | 0.2 | 83.7 | 139.7 | 122.6 | 190.1 |
| 2200 | 0.0 | 0.0 | 0.0 | 0.0 | — | — | — | — |

The above data shows a significant reduction in light transmittance for Example 1 as compared to comparative Example A. This is a valuable aspect of the invention since there are commercial applications requiring a reduction or absence of light transmittance, especially in the telecommunication industry where attenuation of visible light is highly desirable for use in infrared optical connectors. This evaluation shows the necessity to add carbon black to comparative Example A to control and reduce light transmittance to a level demonstrated by Example 1, which is without pigments or dyes. This evaluation shows that additional processing steps are required for the polyetherimide composition of comparative Example A to meet the performance level obtained by Example 1 without additional steps.

As presented in Table 8, the light transmittance for comparative Example A and Example 1 were measured in accordance with ASTM D1003 and tabulated as a function of carbon black loading and molded part thickness. The initial level of light transmittance of the unmodified polyetherimide composition and subsequent yellowness index (YI) determines the quantity of carbon black to be added to reach a desired percent transmittance at a specific thickness. As shown, comparative Example A had a yellowness index of 37.1 and 56.3 that resulted in light transmittance of 77.8 and 69.0%, respectively, at 1.6 and 3.2 mm thickness, respectively. In contrast, Example 1 had light transmittance of 33.3 and 16.8% for 1.6 and 3.2 mm thickness, respectively, because of its yellowness index being much higher at 111.5 and 150.5, respectively.

In order to reduce percent transmittance for comparative Example A, carbon black was added at loading levels of 0, 22, 44, 110, and 2200 ppm followed by compounding of the mixture and injection molding into a color chip for evaluation. For comparison, Example A was processed in a similar fashion. For both examples, the addition of carbon black significantly reduced the percent transmittance and resulted in the appearance of the molded color chip changing from transparent to translucent, with increasing darkness, until opacity was obtained. The carbon black loading level that was required to reduce the percent transmittance to a targeted value was thickness dependent and required higher loading levels as the wall thickness decreased from 3.2 mm to 1.6 mm.

As shown in FIG. 1, addition of approximately 37 ppm of carbon black to comparative Example A would be required to reduce the percent transmittance at 1.6 mm thickness from 77.8% to 33.3% and to obtain equivalency to the percent transmittance of Example 1 without carbon black at 1.6 mm thickness. The addition of carbon black had a similar effect on Example 1, although requiring much less to reach a targeted value. The addition of carbon black to polyetherimide compositions is costly and time consuming since a secondary compounding operation is required and subsequently subjects the polymer compositions to a second heat history. As demonstrated with Example 1, the addition of carbon black is unnecessary if the yellowness index is sufficiently high to reduce transmittance without the addition of any pigments or dyes. This is a preferred method for obtaining a targeted percent transmittance.

The yellowness index tabulated as a function of light transmittance for Example 1 and comparative Example A were evaluated and compared. The results are presented in Table 9.

TABLE 9

| Wavelength (nm) | Ex. A (% T at 1.6 mm) | Ex. 1 (% T at 1.6 mm) | Ex. A with 22 ppm carbon black (% T at 1.6 mm) |
|---|---|---|---|
| 850 | 86.5 | 77.5 | 63.1 |
| 1310 | 87.6 | 85.2 | 71.4 |
| 1550 | 87.2 | 85.4 | 72.8 |

The data show that the polyetherimide composition of Example 1 with a high yellowness index and a subsequently low visible light transmittance is advantageous for applications requiring near infrared (IR) transmittance. The near IR percent transmittance for commercially important wavelengths of 850, 1310, and 1550 nm as a function of material type at 1.6 mm thickness are presented in Table 8. Comparative Example A had percent transmittance values that ranged from 86.5% to 87.6%, whereas Example 1 was similar with 85.2% and 85.4% transmittance at 1310 and 1550 nm, respectively. At 850 nm, the percent transmittance for Example 1 was 77.5%, as compared to 86.5% fir for comparable Example A at this wavelength. An addition of 22 ppm of carbon black to comparative Example A significantly reduced the NIR percent transmittance to 63.1% at 850 nm and 72.8% at 1550 nm. Even though the percent transmittance was lower, the addition of carbon black to attenuate and filter visible light to prevent interference at NIR wavelengths is a viable strategy for which commercial materials are currently being using in such applications.

Figure 2:
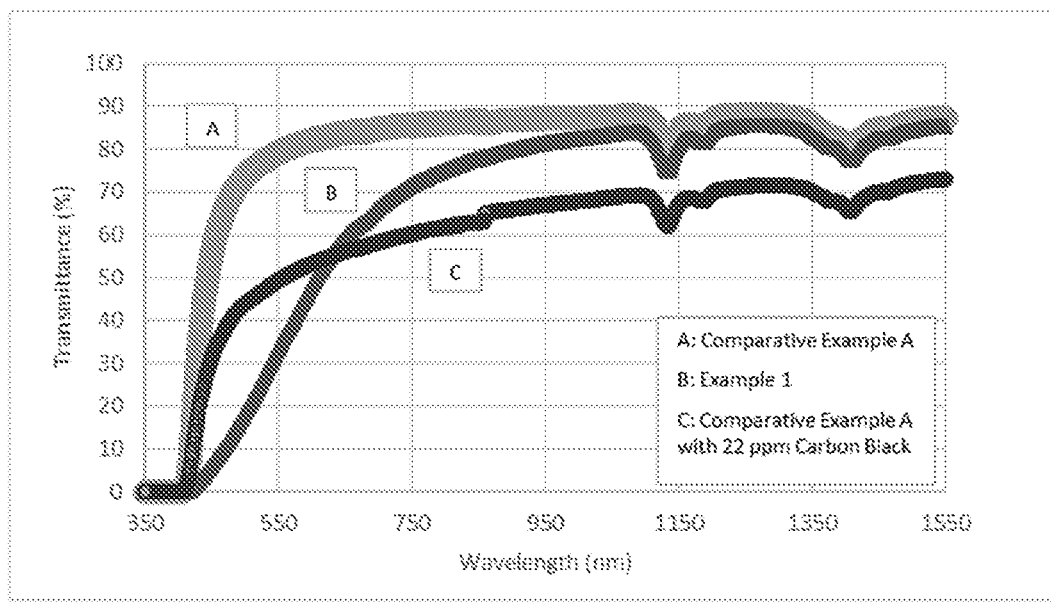
FIG. 2 is graph of percent transmittance (%) versus wavelength (nm) and shows the effect of carbon black loading on transmittance at different wavelengths according to one or more embodiments.

FIG. 2 presents the percent transmittance at wavelengths from 350 to 1550 nm as a function of material type at 1.6 mm thickness. The percent transmittance for Example A, denoted by letter A, increases rapidly in the visible light spectrum (400-700 nm) and approaches 90% and remains relatively high in the NIR region at wavelengths of interest. In contrast, comparative Example A with carbon black addition significantly attenuates and filters transmittance over the same region to 65-70%, which is highly desirable to prevent interference with commercial devices using the IR spectrum in telecommunications. Although this has had a negative effect of reducing percent IR transmittance at the desired wavelengths, it is a preferred solution. This has led to a series of attenuation-controlled polymer grades that are commercially available and used in optical devices. Example 1, denoted as B in FIG. 2, is the most preferred solution since visible light is attenuated without substantially affecting percent transmittance in the IR region, especially at wavelengths of 850, 1310, and 1550 nm. In addition, the characteristic transmittance curve for Example 1 is a significant improvement to the carbon black attenuation, since filtering or blockage of specific wavelengths can be achieved by a materials yellowness index, inversely related to percent transmittance, or its thickness without a corresponding change of transmittance in the IR region. Another advantage of the invention is the lack of a secondary processing step and subsequent concern with carbon black dispersion and/or agglomeration. Finally, as fiber optic lens, connectors, and sensors reduce in size, a material that can transmit certain wavelengths of the infrared spectrum while selectively absorbing or reflecting others becomes more desirable.

The compositions, method, and articles are further illustrated by the following Embodiments, which are non-limiting.

Embodiment 1

A polyetherimide composition comprising a polyetherimide; and (a) two or more of the following compositional components: a residual metal content of greater than 40 ppm; greater than 20 ppm of a sulfate anion; greater than 20 ppm of a phosphate anion; greater than 5 ppm of a nitrite anion, a nitrate anion, or a combination comprising at least one of the foregoing; a residual solvent content of greater than 500 ppm; a phosphorus-containing stabilizer in an amount of 0 to 3 wt %; or greater than 25 ppm of an alkali metal halide, an alkaline earth metal halide, alkali metal carbonate, or a combination comprising at least one of the foregoing; or (b) wherein the polyetherimide has a residual reactive end group concentration of greater than 0.2 mol % of reactive anhydride end groups, or greater than 0.2 mol % of reactive amine endgroups, or both, preferably wherein the polyetherimide has a residual reactive end group concentration of greater than 0.2 mol % of reactive anhydride end groups and greater than 0.2 mol % of reactive amine endgroups; or (c) both (a) and (b); and (d) wherein the polyetherimide composition exhibits two or more of the following physical properties: a yellowness index of greater than 130, preferably greater than 140, more preferably greater than 150, at a thickness of 3.2 millimeters, determined according to ASTM D1925; a haze of greater than 10% at a thickness of 3.2 millimeters, determined according to ASTM D1003; a PDI* value of greater than 1.53, preferably greater than 1.55, more preferably greater than 1.57, wherein PDI* is the ratio of z-average molecular weight to weight average molecular weight as determined by gel permeation chromatography; a melt viscosity ratio of greater than 4, as determined from a ratio of a melt viscosity at a shear rate of 100 l/second to a melt viscosity at a shear rate of 5,000 l/second, when measured by capillary rheometry at 380° C.; a pH of less than 6.5 or greater than 7; a tensile strength at yield greater than 84 MPa, as determined according to ASTM D638; and a heat distortion temperature at 1.82 MPa of greater than or equal to 150° C. as determined according to ASTM D648 on a 3.2 millimeter thick sample.

Embodiment 2

The polyetherimide composition of Embodiment 1, wherein the polyetherimide composition has three, or three or more of the compositional components (a), or four, or four or more of the compositional components (a), or five or six of the compositional components (a); or wherein the polyetherimide has the reactive end group level (b) and has two or more of the compositional components (a), or three, or three or more of the compositional components (a), or four, or four or more of the compositional components (a), or five or six of the compositional components (a); or the polyetherimide composition has two, or two or more of the physical properties (d), or three or three or more of the physical properties (d), or four or four or more of the physical properties (d), or five or five or more of the physical properties (d), or six or seven or more of the physical properties (d).

Embodiment 3

The polyetherimide composition of Embodiment 1 or 2, wherein the polyetherimide composition comprises two or more of: greater than 40 to 1,000 ppm, or 40 to 500 ppm, or 50 to 500 ppm, or 60 to 500 ppm, or 61 to 500 ppm, or 100 to 500 ppm of the residual metal content, preferably wherein the residual metal content comprises sodium, iron, molybdenum, chromium, zinc, aluminum, calcium, manganese, cobalt, magnesium, copper, silicon, potassium, nickel, or a combination comprising at least one of the foregoing, preferably sodium, iron, molybdenum, magnesium, chromium, copper, potassium, nickel, or a combination comprising at least one of the foregoing, more preferably sodium, molybdenum, magnesium, chromium, copper, potassium, nickel, or a combination comprising at least one of the foregoing; 20 to 1,000 ppm, or 20 to 500 ppm, or 30 to 500 ppm, or 40 to 500 ppm, or 50 to 500 ppm, or 60 to 500 ppm, or 100 to 500 ppm of the sulfate anion; 20 to 1,000 ppm, or 20 to 500 ppm, or 30 to 500 ppm, or 40 to 500 ppm, or 50 to 500 ppm, or 60 to 500 ppm, or 100 to 500 ppm of the phosphate anion; or greater than 5 to 1,000 ppm, or greater than 5 to 500 ppm of the nitrite anion, a nitrate anion, or a combination comprising at least one of the foregoing; or greater than 10 to 1,000 ppm, greater than 10 to 500 ppm, or greater than 20 to 500 ppm, or greater 100 ppm to 500 ppm of a residual chloride anion; or greater than 500 to 10,000 ppm, or 1,000 to 10,000 ppm, or 1,500 to 10,000 ppm, or 1,500 to 5,000 ppm of the residual solvent content; or preferably wherein the residual solvent comprises ortho-dichlorobenzene, N-methylpyrrolidinone, dimethylacetamide, dimethylformamide, ortho-cresol, meta-cresol, para-cresol, chlorobenzene, anisole, veratrole, dichlorotoluene, 1,2,4-trichlorobenzene, diphenyl sulfone, diphenylether, phenetole, dimethylsulfoxide, sulfolane, methylene chloride, ethylene tetrachloride, trichloromethane, acetone, methanol, ethanol, or a combination comprising at least one of the foregoing; or greater than 10 to 5,000 ppm or greater than 10 to 1,000 ppm, or 50 to 1,000 ppm, or 50 to 500 ppm, or 50 to 250 ppm, or greater than 10 to 500 ppm of the alkali metal halide, alkaline earth metal halide, alkali metal carbonate, or combination comprising at least one of the foregoing, preferably wherein the alkali metal halide, alkaline earth metal halide, alkali metal carbonate, or combination comprising at least one of the foregoing comprises an alkali metal chloride, alkaline earth metal chloride, alkali metal fluoride, alkaline earth metal fluoride, alkali metal iodide, alkaline earth metal iodide, an alkali metal carbonate or a combination comprising at least one of the foregoing, preferably sodium chloride or sodium carbonate.

Embodiment 4

The polyetherimide composition of any one or more of Embodiments 1 to 3, wherein the polyetherimide composition exhibits one or more of: a haze level of greater than 10% to 100%, preferably 12 to 75%, more preferably 12 to 50%, determined according to ASTM D1003 at a thickness of 3.2 millimeters; or a yellowness index of greater than 130 to 300, preferably greater than 130 to 250, more preferably 135 to 190, even more preferably 135 to 160, determined according to ASTM D1925 at a thickness of 3.2 millimeters; or a percent transmittance of 0 to 50 at a thickness of 3.2 millimeters, as determined according to ASTM D1003; or a PDI* of greater than 1.53 to 2, preferably 1.6 to 2, or greater than 2; or a melt viscosity ratio of greater than 4, as determined from a ratio of a melt viscosity at a shear rate of 100 1/second to a melt viscosity at a shear rate of 5,000 1/second, when measured by capillary rheometry at 380° C.

Embodiment 5

The polyetherimide composition of any one or more of Embodiments 1 to 4 wherein the polyetherimide composition comprises greater than 40 to 500 ppm of the residual metal content comprising sodium, iron, molybdenum, magnesium, copper, calcium, chromium, potassium, nickel, or a combination comprising at least one of the foregoing; 500 to 10,000 ppm of the residual solvent comprising ortho-dichlorobenzene, N-methylpyrrolidinone, dimethylacetamide, cresol, chlorobenzene, anisole, veratrole, trichloromethane, or a combination comprising at least one of the foregoing; and wherein the polyetherimide composition exhibits a yellowness index of greater than 130 to 250 at a thickness of 3.2 millimeters, as determined according to ASTM D1925.

Embodiment 6

The polyetherimide composition of any one or more of Embodiments 1 to 5, wherein the polyetherimide composition further comprises one or both of a reinforcing filler and a colorant.

Embodiment 7

The polyetherimide composition of any one or more of Embodiments 1 to 6, wherein the polyetherimide is derived from polymerization of an aromatic bis(ether phthalic anhydride) (5), wherein Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded; and an organic diamine (6), wherein each R is independently a substituted or unsubstituted $C_{6-20}$ aromatic hydrocarbon group, a substituted or unsubstituted straight or branched chain $C_{4-20}$ alkylene group, or a substituted or unsubstituted $C_{3-8}$ cycloalkylene group, preferably meta-phenylene, para-phenylene, bis(4,4'-phenylene)sulfonyl, and each Z is 4,4'-diphenylene isopropylidene.

Embodiment 8

The polyetherimide composition of any one or more of Embodiments 1 to 6, wherein the polyetherimide is derived from polymerization of a substituted bisimide (9), wherein X is nitro, bromo, or chloro, and each R is independently a substituted or unsubstituted $C_{6-20}$ aromatic hydrocarbon group, a substituted or unsubstituted straight or branched chain $C_{4-20}$ alkylene group, or a substituted or unsubstituted $C_{3-8}$ cycloalkylene group; and a salt (7), wherein M is an alkali metal, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded; preferably wherein each R is independently meta-phenylene, para-phenylene, bis(4,4'-phenylene)sulfonyl, or a combination comprising at least one of the foregoing, each Z is 4,4'-diphenylene isopropylidene, and each X is chloro.

Embodiment 9

The polyetherimide composition of any one or more of Embodiments 1 to 8, wherein the polyetherimide comprises units (1), wherein each R is independently a substituted or unsubstituted $C_{6-20}$ aromatic hydrocarbon group, a substituted or unsubstituted straight or branched chain $C_{4-20}$ alkylene group, or a substituted or unsubstituted $C_{3-8}$ cycloalkylene group; and each Z is independently an aromatic $C_{6-24}$ monocyclic or polycyclic group optionally substituted with 1 to 6 $C_{1-8}$ alkyl groups, 1-8 halogen atoms, or a combination comprising at least one of the foregoing.

Embodiment 10

The polyetherimide composition of any one or more of Embodiments 7 to 9, wherein each R is independently a divalent group of formulas (2), wherein $Q^1$ is —O—, —S—, —C(O)—, —SO$_2$—, —SO—, —$C_yH_{2y}$— or a halogenated derivative thereof wherein y is an integer from 1 to 5, or —$(C_6H_{10})_z$— wherein z is an integer from 1 to 4; and Z is a group of the formula (3), wherein $R^a$ and $R^b$ are each independently a halogen atom or a monovalent $C_{1-6}$ alkyl group, p and q are each independently integers of 0 to 4, c is 0 to 4, and $X^a$ is a single bond, —O—, —S—, —S(O)—, —SO$_2$—, —C(O)—, or a $C_{1-18}$ organic bridging group; preferably wherein each R is independently meta-phenylene, para-phenylene, bis(4,4'-phenylene)sulfonyl, or a combination comprising at least one of the foregoing, and each Z is 4,4'-diphenylene isopropylidene.

Embodiment 11

The polyetherimide composition of any one or more of Embodiments 1 to 10, wherein the polyetherimide composition further comprises, based on the total weight of the polyetherimide composition, greater than 5 wt %, preferably 5 to 10 wt % of an impurity comprising a structural units derived from at least one monomer, at least one endcapping agent, or a combination comprising at least one of the foregoing.

Embodiment 12

A thermoplastic composition comprising 1 to 99 wt % of the polyetherimide composition of any one or more of embodiments 1 to 23; and 1 to 99 wt % of a polymer different from the polyetherimide, preferably wherein the polymer different from the polyetherimide comprises a polyacetal, poly($C_{1-6}$ alkyl)acrylate, polyacrylamide, polyamide, polyamideimide, polyanhydride, polyarylate, polyarylene ether, polyarylene sulfide, polyarylsulfone, polybenzothiazole, polybenzoxazole, polycarbonate, polyester, polyetheretherketone, polyetherketoneketone, polyetherketone, polyethersulfone, poly($C_{1-6}$ alkyl)methacrylate, polymethacrylamide, polynorbornene, polyolefin, polyoxadiazole, polyoxymethylene, polyphthalide, polysilazane, polysiloxane, polystyrene, polysulfide, polysulfonamide, polysulfonate, polysulfone, polythioester, polytriazine, polyurea, polyurethane, polyvinyl alcohol, polyvinyl ester, polyvinyl ether, polyvinyl halide, polyvinyl ketone, polyvinyl thioether, a fluoropolymer, or a combination comprising at least one of the foregoing; and optionally a particulate filler, antioxidant, heat stabilizer, light stabilizer, ultraviolet light stabilizer, UV absorbing additive, plasticizer, lubricant, release agent, antistatic agent, anti-fog agent, antimicrobial agent, colorant, surface effect additive, radiation stabilizer, flame retardant, anti-drip agent, or a combination comprising at least one of the foregoing.

Embodiment 13

An article comprising the polyetherimide composition of any one or more of Embodiments 1 to 12, wherein the article is a fiber, a film, a sheet, a foam, a filament, a molded article, an extruded article, or a powder.

Embodiment 14

A method for the manufacture of the polyetherimide composition of any one or more of Embodiments 1 to 7 and 9 to 13, the method comprising, polymerizing an aromatic bis(ether phthalic anhydride) (5) with an organic diamine (6), wherein in the foregoing formulas, Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded, and each R is independently a substituted or unsubstituted $C_{6-20}$ aromatic hydrocarbon group, a substituted or unsubstituted straight or branched chain $C_{4-20}$ alkylene group, or a substituted or unsubstituted $C_{3-8}$ cycloalkylene group, preferably meta-phenylene, para-phenylene, bis(4,4'-phenylene)sulfonyl, and each Z is 4,4'-diphenylene isopropylidene.

Embodiment 15

The method of Embodiment 14, wherein the aromatic bis(ether phthalic anhydride) is obtained by a method comprising reacting a dialkali metal salt of a dihydroxy aromatic compound (7), with a reactive substituted phthalimide (8) under conditions effective to form a first mixture comprising an aromatic bisimide (9); and contacting the first mixture with a phthalic anhydride in the presence of a catalyst and under conditions effective to provide the aromatic bis(ether phthalic anhydride), wherein in the foregoing formulas, M is an alkali metal, preferably sodium, X is nitro, chloro, or bromo, preferably nitro, $R^1$ is a $C_{1-6}$ alkyl, preferably methyl, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, preferably 4,4'-diphenylene isopropylidene.

Embodiment 16

The method of Embodiment 15, wherein reacting the dialkali metal salt of the dihydroxy aromatic compound with the reactive substituted phthalimide is in the presence of a solvent, preferably a nonpolar organic solvent, more preferably wherein the nonpolar organic solvent is toluene; or a phase transfer catalyst, preferably wherein the phase transfer catalyst is a hexaalkylguanidinium salt, more preferably wherein the phase transfer catalyst is hexaethylguanidinium chloride.

Embodiment 17

The method of Embodiment 14, wherein the aromatic bis(ether phthalic anhydride) is obtained by a method comprising reacting a dialkali metal salt of a dihydroxy aromatic compound (7) with a reactive substituted phthalimide (8) under conditions effective to form a first mixture comprising an aromatic bisimide (9); hydrolyzing the aromatic bisimide in the first reaction mixture under conditions effective to provide the tetraacid (10); and condensing the tetraacid under conditions effective to provide the aromatic bis(ether phthalic anhydride), wherein in the above formulas, M is an alkali metal, preferably sodium, X is nitro, chloro, or bromo, preferably nitro, $R^1$ is a $C_{1-6}$ alkyl, preferably methyl, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, preferably 4,4'-diphenylene isopropylidene.

Embodiment 18

The method of any one or more of Embodiments 14 to 17, wherein the polymerizing is in the presence of a solvent comprising ortho-dichlorobenzene, N-methylpyrrolidinone, dimethylacetamide, dimethylformamide, cresol, chlorobenzene, anisole, veratrole, dichlorotoluene, 1,2,4-trichlorobenzene, diphenyl sulfone, diphenylether, phenetole, dimethylsulfoxide, trichloromethane, acetone, methanol, ethanol, or a combination comprising at least one of the foregoing.

Embodiment 19

A method for the manufacture of the polyetherimide composition of any one or more of Embodiments 1 to 11, the method comprising, contacting a substituted phthalic anhydride (11) with an organic diamine (6), to provide a reaction mixture comprising a bis(phthalimide) (12); and polymerizing the bis(phthalimide) and an alkali metal salt of a dihydroxy aromatic compound (7) to provide the polyetherimide; wherein in the foregoing formulas: X is fluoro, chloro, bromo, iodo, nitro, or a combination comprising at least one of the foregoing, preferably chloro; each R is independently a substituted or unsubstituted $C_{6-20}$ aromatic hydrocarbon group, a substituted or unsubstituted straight or branched chain $C_{4-20}$ alkylene group, or a substituted or unsubstituted $C_{3-8}$ cycloalkylene group, preferably meta-phenylene, para-phenylene, bis(4,4'-phenylene)sulfonyl, or a combination comprising at least one of the foregoing; M is an alkali metal, preferably sodium; and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, preferably 4,4'-diphenylene isopropylidene.

Embodiment 20

The method of Embodiment 19, wherein the polymerizing is in the presence of a solvent comprising ortho-dichlorobenzene, N-methylpyrrolidinone, dimethylacetamide, dimethylformamide, chlorobenzene, anisole, veratrole, dichlorotoluene, 1,2,4-trichlorobenzene, diphenyl sulfone, diphenylether, phenetole, dimethylsulfoxide, or a combination comprising at least one of the foregoing.

The compositions, methods, and articles can alternatively comprise, consist of, or consist essentially of, any appropriate components herein disclosed. The compositions, methods and articles can additionally, or alternatively, be formulated so as to be devoid, or substantially free, of any components, materials, ingredients, adjuvants, steps, or species used in the prior art compositions or methods that are otherwise not necessary to the achievement of the function or objectives of the present invention. All ranges disclosed herein are inclusive of the endpoints, and the endpoints are independently combinable with each other. "Combination" is inclusive of blends, mixtures, alloys, reaction products, and the like. "Or" means "and/or." The terms "first," and "second" do not denote any order, quantity, or importance, but rather are used to distinguish one element from another. The terms "a," "an," and "the" do not denote a limitation of quantity, and include both the singular and the plural, unless otherwise indicated herein or clearly contradicted by context. The described elements can be combined in any suitable manner in the embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" and "alkylene" mean a monovalent or divalent, respectively, branched or straight chain, saturated hydrocarbon group, e.g., methyl, ethyl, i-propyl, and n-butyl. means a straight or branched chain, saturated, divalent hydrocarbon group (e.g., methylene (—$CH_2$—) or propylene (—$(CH_2)_3$—)). "Alkenyl" and "alkenylene" mean a monovalent or divalent, respectively, straight or branched chain hydrocarbon group having at least one carbon-carbon double bond (e.g., ethenyl (—HC=$CH_2$) or propenylene (—HC($CH_3$)=$CH_2$—). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, —$C_nH_{2n-x}$ and —$C_nH_{2n-2x}$— wherein x is the number of cyclization(s). "Aryl" means a monovalent, monocyclic, or polycyclic aromatic group (e.g., phenyl or naphthyl). "Arylene" means a divalent, monocyclic, or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P. "Substituted" means that the compound or group is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g., benzyl), $C_{7-12}$ alkylarylene (e.g., toluyl), $C_{4-12}$ heterocycloalkyl, $C_{3-12}$ heteroaryl, $C_{1-6}$ alkyl sulfonyl (—S(=O)$_2$-alkyl), $C_{6-12}$ arylsulfonyl (—S(=O)$_2$-aryl), or tosyl ($CH_3C_6H_4SO_2$—), provided that the substituted atom's normal valence is not exceeded, and that the substitution does not significantly adversely affect the manufacture, stability, or desired use of the compound. When a compound is substituted, the indicated number of carbon atoms is the total number of carbon atoms in the group, including those of the substituent(s).

All cited patents, patent applications, and other references are incorporated herein by reference in their entirety. While particular embodiments have been described, equivalents that are or may be presently unforeseen may arise to applicants or others skilled in the art. Accordingly, the appended claims as filed and as they may be amended are intended to embrace all such equivalents.

What is claimed is:
1. A polyetherimide composition comprising
a polyetherimide; and
(a) two or more of the following compositional components
greater than 20 to 1,000 ppm of a sulfate anion,
greater than 20 to 1,000 ppm of a phosphate anion,
greater than 10 to 1,000 ppm of a chloride anion, and
greater than 25 to 5,000 ppm of an alkali metal halide, alkaline earth metal halide, alkali metal carbonate, or a combination comprising at least one of the foregoing; and
(b) wherein the polyetherimide composition exhibits:
a yellowness index of greater than 130, determined according to ASTM D6290;
a PDI* value of greater than 1.53, wherein PDI* is the ratio of z-average molecular weight to weight average molecular weight as determined by gel permeation chromatography; and
optionally, one or more of the following physical properties:
a haze of greater than 10% at a thickness of 3.2 millimeters, determined according to ASTM D1003;
a melt viscosity ratio of greater than 4, as determined from a ratio of a melt viscosity at a shear rate of 100 1/second to a melt viscosity at a shear rate of 5,000 1/second, when measured by capillary rheometry at 380° C.;
a pH of less than 6.5 or greater than 7;
a tensile strength at yield greater than 84 MPa, as determined according to ASTM D638; and
a heat distortion temperature at 1.82 MPa of greater than or equal to 150° C. as determined according to ASTM D648 on a 3.2 millimeter thick sample;
wherein the polyetherimide composition is derived from polymerization of an aromatic bis(ether phthalic anhydride) of the formula

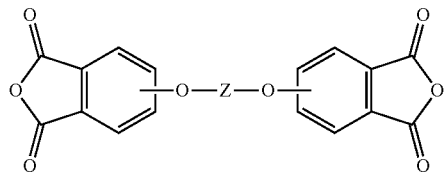

wherein each Z is independently an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded; and
an organic diamine of the formula

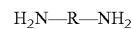

wherein each R is independently a substituted or unsubstituted $C_{6-20}$ aromatic hydrocarbon group, a substituted or unsubstituted straight or branched chain $C_{4-20}$ alkylene group, a substituted or unsubstituted $C_{3-8}$ cycloalkylene group;
wherein the compositional components of the polyetherimide composition are residues arising from polymerizing the aromatic bis(ether phthalic anhydride) and the organic diamine.
2. The polyetherimide composition of claim 1, wherein the polyetherimide composition further comprises one or more of:
greater than 40 to 1,000 ppm of a residual metal content; or
greater than 5 to 500 ppm of the nitrite anion, a nitrate anion, or a combination comprising at least one of the foregoing; or
greater than 500 to 10,000 ppm of a residual solvent content.

3. The polyetherimide composition of claim 1, wherein the polyetherimide composition exhibits:
a yellowness index of greater than 130 to 300, determined according to ASTM D6290 at a thickness of 3.2 millimeters; and
and a PDI* of greater than 1.53 to 2; and
optionally, a haze level of greater than 10% to 100%, determined according to ASTM D1003 at a thickness of 3.2 millimeters.

4. The polyetherimide composition of claim 1, wherein the polyetherimide composition further comprises one or both of a reinforcing filler and a colorant.

5. The polyetherimide composition of claim 1, wherein the polyetherimide comprises units of the formula

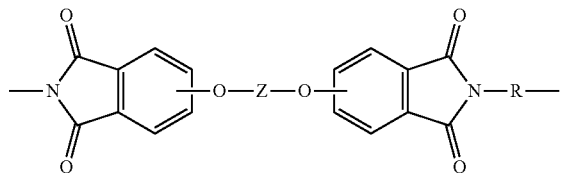

wherein
each R is independently a substituted or unsubstituted $C_{6-20}$ aromatic hydrocarbon group, a substituted or unsubstituted straight or branched chain $C_{4-20}$ alkylene group, a substituted or unsubstituted $C_{3-8}$ cycloalkylene group; and
each Z is independently an aromatic $C_{6-24}$ monocyclic or polycyclic group optionally substituted with 1 to 6 $C_{1-8}$ alkyl groups, 1-8 halogen atoms, or a combination comprising at least one of the foregoing.

6. The polyetherimide composition of claim wherein each R is independently a divalent group of the formula

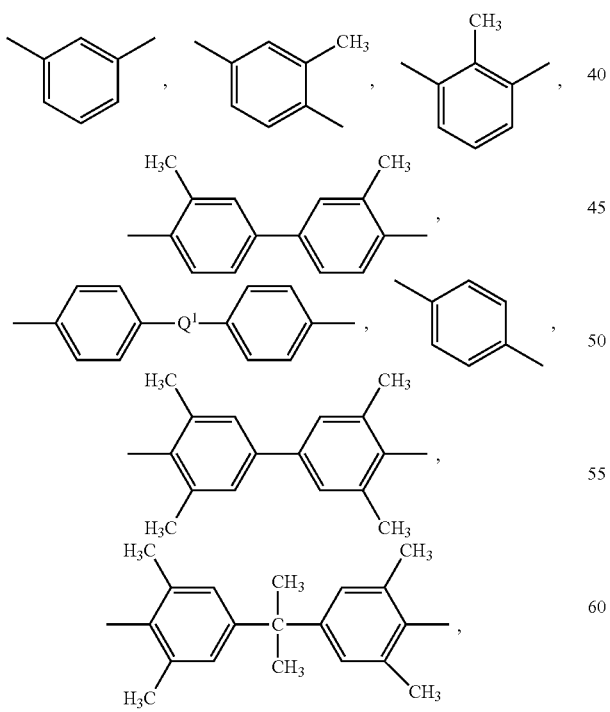

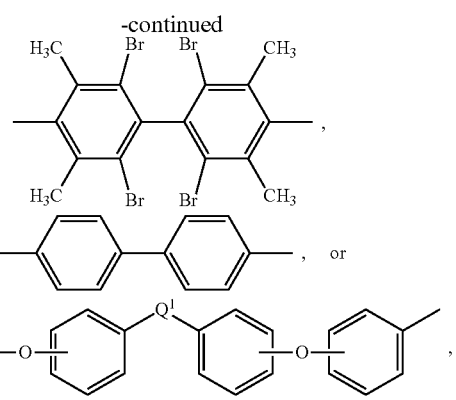

wherein $Q^1$ is —O—, —S—, —C(O)—, —SO$_2$—, —SO—, —$C_yH_{2y}$— or a halogenated derivative thereof
wherein y is an integer from 1 to 5, or —$(C_6H_{10})_z$— wherein z is an integer from 1 to 4; and
Z is a group of the formula

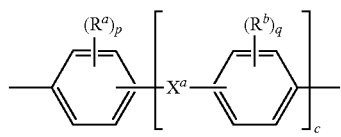

wherein
$R^a$ and $R^b$ are each independently a halogen atom or a monovalent $C_{1-6}$ alkyl group,
p and q are each independently integers of 0 to 4,
c is 0 to 4, and
$X^a$ is a single bond, —O—, —S—, —S(O)—, —SO$_2$—, —C(O)—, —P($R^a$)(=O)— wherein $R^a$ is a $C_{1-8}$ alkyl or $C_{6-12}$ aryl, or a $C_{1-18}$ organic bridging group.

7. The polyetherimide composition of claim 1, wherein the polyetherimide composition further comprises, based on the total weight of the polyetherimide composition, greater than 5 weight percent of an impurity comprising a structural units derived from at least one monomer, at least one endcapping agent, or a combination comprising at least one of the foregoing.

8. A thermoplastic composition comprising
1 to 99 weight percent of the polyetherimide composition of claim 1; and
1 to 99 weight percent of a polymer different from the polyetherimide; and optionally
a particulate filler, antioxidant, heat stabilizer, light stabilizer, ultraviolet light stabilizer, UV absorbing additive, plasticizer, lubricant, release agent, antistatic agent, anti-fog agent, antimicrobial agent, colorant, surface effect additive, radiation stabilizer, flame retardant, anti-drip agent, or a combination comprising at least one of the foregoing.

9. An article comprising the polyetherimide composition of claim 1, wherein the article is a fiber, a film, a sheet, a foam, a filament, a molded article, an extruded article, or a powder.

* * * * *